(12) United States Patent
Douady-Pleven et al.

(10) Patent No.: US 10,499,085 B1
(45) Date of Patent: Dec. 3, 2019

(54) IMAGE SIGNAL PROCESSING BASED ENCODING HINTS FOR BITRATE CONTROL

(71) Applicant: GoPro, Inc., San Mateo, CA (US)

(72) Inventors: Bruno Cesar Douady-Pleven, Gif-sur-Yvette (FR); Sandeep Doshi, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 177 days.

(21) Appl. No.: 15/358,495

(22) Filed: Nov. 22, 2016

Related U.S. Application Data

(60) Provisional application No. 62/341,580, filed on May 25, 2016.

(51) Int. Cl.
| | |
|---|---|
| *H04N 9/47* | (2006.01) |
| *H04N 7/18* | (2006.01) |
| *H04N 19/90* | (2014.01) |
| *H04N 19/176* | (2014.01) |
| *H04N 19/423* | (2014.01) |

(Continued)

(52) U.S. Cl.
CPC ............ *H04N 19/90* (2014.11); *H04N 19/10* (2014.11); *H04N 19/136* (2014.11); *H04N 19/176* (2014.11); *H04N 19/423* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2008/0240612 A1 | 10/2008 | Liang | |
| 2009/0290641 A1* | 11/2009 | Crinon | H04N 19/56 375/240.16 |

(Continued)

FOREIGN PATENT DOCUMENTS

WO    2015172235    11/2015

OTHER PUBLICATIONS

PCT International Search Report and Written Opinion for PCT/US2017/034422 dated Aug. 1, 2017.

(Continued)

*Primary Examiner* — Talha M Nawaz
(74) *Attorney, Agent, or Firm* — Young Basile Hanlon & MacFarlane, P.C.

(57) ABSTRACT

Image signal processing based encoding hints for bitrate control may include an image signal processor receiving an input image signal, identifying a block of a frame based on the input image signal, generating processed image data corresponding to the block, determining a processed image indication for the block, and outputting the processed image data and the processed image indication as an encoding hint. Image signal processing based encoding hints for bitrate control may include an encoder receiving source image data for a frame, the source image data including the processed image data corresponding to the block, receiving source image indications for the frame, the source image indications including the processed image indication, determining an encoding parameter for encoding the frame based on the processed image indication, generating an encoded frame by encoding the frame using the encoding parameter, and outputting or storing the encoded frame.

20 Claims, 15 Drawing Sheets

(51) Int. Cl.
*H04N 19/70* (2014.01)
*H04N 19/136* (2014.01)
*H04N 19/10* (2014.01)

(56) References Cited

U.S. PATENT DOCUMENTS

| | | | |
|---|---|---|---|
| 2010/0189179 A1 | 7/2010 | Gu | |
| 2010/0322306 A1* | 12/2010 | Au | H04N 19/176 375/240.03 |
| 2011/0033130 A1 | 2/2011 | Poon | |
| 2012/0154545 A1 | 6/2012 | Choi | |
| 2013/0021483 A1* | 1/2013 | Bennett | H04N 19/56 348/208.4 |
| 2013/0051689 A1 | 2/2013 | Shimauchi | |
| 2013/0051697 A1* | 2/2013 | Takahashi | G06T 5/002 382/265 |
| 2014/0028876 A1 | 1/2014 | Mills | |
| 2014/0341287 A1* | 11/2014 | Mody | H04N 19/176 375/240.13 |
| 2015/0016543 A1* | 1/2015 | Rapaka | H04N 19/597 375/240.25 |
| 2015/0049193 A1 | 2/2015 | Gupta | |
| 2015/0302561 A1 | 10/2015 | Pekkucuksen | |
| 2015/0317781 A1 | 11/2015 | Napier | |
| 2016/0037061 A1* | 2/2016 | Lim | H04N 5/23229 348/241 |
| 2016/0307346 A1 | 10/2016 | Staudenmaier | |
| 2017/0084007 A1* | 3/2017 | Rakhshanfar | H04N 5/21 |
| 2017/0287184 A1 | 10/2017 | Pettersson | |

OTHER PUBLICATIONS

Pesquet-Popescu et al., "Motion Estimation Techniques," TELECOM Paris Tech, https://pdfs.semanticscholar.org/98ca/f8325abb40aa6bbddd0e7f5d3a6c366d03e6.pdf, 76 pages.

Form PCT/ISA/206 and Annex to Form PCT/ISA/206 Communication Relating to the Results of the Partial International Search for International Application No. PCT/US2017/034231 dated Sep. 13, 2017 (14 pgs).

PCT International Search Report and Written Opinion for PCT/US2017/034231 dated Nov. 7, 2017, 19 pages.

PCT International Preliminary Report and Writtten Opinion for PCT/US2017/034422, dated Nov. 27, 2018, 10 pages.

PCT International Preliminary Report and Written Opinion for PCT/US2017/034231 dated Nov. 27, 2018, 11 pages.

* cited by examiner

1100

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |

1110

| $P_{0,0}$ ⋯ | ⋯ $P_{0,1}$ ⋯ | ⋯ $P_{0,2}$ ⋯ | ⋯ $P_{0,3}$ |
|---|---|---|---|
| $P_{1,0}$ ⋯ | ⋯ $P_{1,1}$ ⋯ | ⋯ $P_{1,2}$ ⋯ | ⋯ $P_{1,3}$ |
| $P_{2,0}$ ⋯ | ⋯ $P_{2,1}$ ⋯ | ⋯ $P_{2,2}$ ⋯ | ⋯ $P_{2,3}$ |
| $P_{3,0}$ ⋯ | ⋯ $P_{3,1}$ ⋯ | ⋯ $P_{3,2}$ ⋯ | ⋯ $P_{3,3}$ |

FIG. 11

IMAGE SIGNAL PROCESSING BASED ENCODING HINTS FOR BITRATE CONTROL

CROSS-REFERENCE TO RELATED APPLICATION(S)

This application claims the benefit of U.S. Provisional Application No. 62/341,580, filed on May 25, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, spatially combining images, image distortion compensation, bitrate allocation, image alignment, and prevention of highlight clipping.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for utilizing encoding hints for bitrate control.

One aspect of the disclosure relates to a non-transitory computer-readable apparatus. In one implementation, the apparatus comprises a storage medium having executable instructions stored thereon. The instructions, when executed by a processor, implement performance of operations, the operations including receiving, by an image signal processor, from an image sensor, an input image signal; identifying, by the image signal processor, a block of a frame based on the input image signal; generating, by the image signal processor, processed image data corresponding to the block; determining, by the image signal processor, a processed image indication for the block; outputting, by the image signal processor, the processed image data; outputting, by the image signal processor, the processed image indication as an encoding hint; receiving, by an encoder, source image data for a frame, the source image data including the processed image data corresponding to the block; receiving, by the encoder, source image indications for the frame, the source image indications including the processed image indication; determining, by the encoder, an encoding parameter for encoding the frame based on the processed image indication; generating, by the encoder, an encoded frame by encoding the frame using the encoding parameter; and outputting or storing, by the encoder, the encoded frame.

A second aspect of the disclosure is a method for use in bitrate control. The method includes receiving, by an image signal processor, an input video including a sequence of input frames; determining, by the image signal processor, image indications based on the input video; storing the image indications in a shared memory; reading, by an encoder, the image indications from the shared memory; determining, by the encoder, an encoding parameter based on the image indications; generating, by the encoder, an encoded video using the encoding parameter; and outputting or storing, by the encoder, the encoded video.

In a third aspect of the disclosure, an image capture apparatus for bitrate control is disclosed. The image capture apparatus includes an image sensor configured to capture an image; an image signal processor configured to: receive an input image signal including the image represented in a first format; generate activity variance metrics based on the image; and generate a source image in a second format based on the image. The image capture apparatus also includes a memory for storing the activity variance metrics and the source image; and an encoder configured to: read the source image and the activity variance metrics from the memory; determine a quantization parameter based on the activity variance metrics; generate an encoded image by encoding the source frame using the quantization parameter; and output or store the encoded image.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 11 shows examples of blocks for determining scene complexity metrics in accordance with this disclosure.

Figure 1:
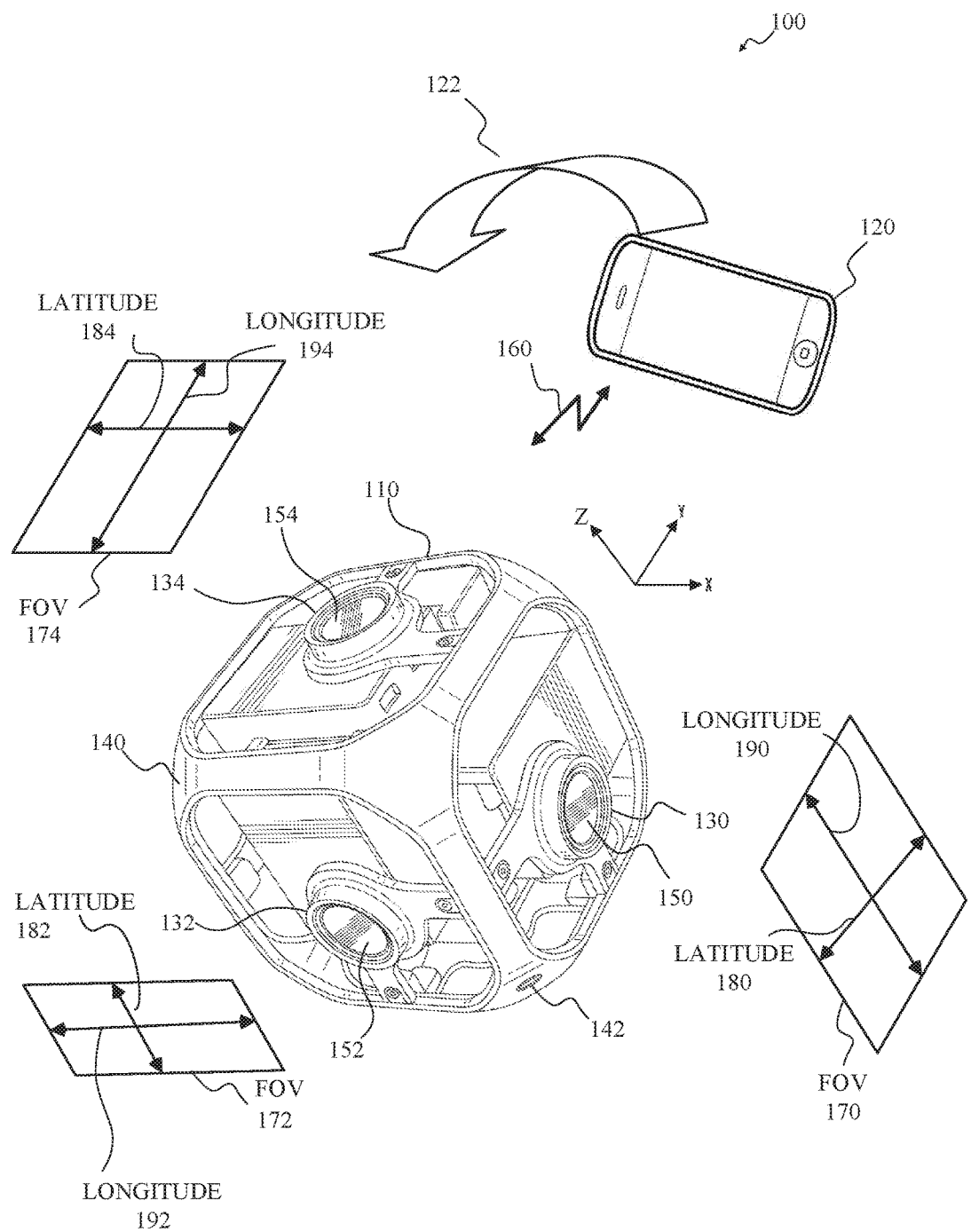
FIG. 1 is a diagram of an example of an image capture system for content capture in accordance with implementations of this disclosure.

All figures disclosed herein are © Copyright 2016 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more sensors and may process the image signal to generate an image, picture, or frame. The generated images may be stored, such as in a memory of an image capture device, and/or sent to an encoder for encoding, which may include compression.

Compressing, or encoding, an image, or video, may include allocating encoding resources, such as bit allocations, for encoding the images, or portions thereof. Allocating encoding resources may include identifying encoding parameters, such as quantization parameters, and rate control to optimize bit allocation in the encoded stream. These parameters can be determined by hardware and/or software. Single-pass encoding may inefficiently allocate resources for some portions, such as some blocks, of an image or frame. Multi-pass encoding may increase processor utilization, latency, or both.

In some implementations, encoding hints for bitrate control are determined by an image signal processor and passed to an encoder with a corresponding frame or frames of video to be encoded. The image signal processor may process complete frames of video before hand-off to the encoder to facilitate integration of the two components and/or because the image signal processor implements a multi-pass algorithm (e.g., for local motion compensation and temporal noise reduction) to process a frame of video data. Because the image signal processor processes complete frames of video before the encoder, the image signal processor is able to determine encoding hints based on a complete frame of data which may then be made available to the encoder when the encoder starts encoding the frame. This allows the encoder to utilize frame-wide information while only performing a single pass to encode the frame. Thus the encoder may utilize these encoding hints to improve resource allocation relative to single-pass encoding without the encoding hints, and may reduce processor utilization, latency, or both, relative to multi-pass encoding. Image signal processing based encoding hints for bitrate control may include the image signal processor generating encoding hints, such as image indications, and storing the encoding hints in a shared memory. The encoder may read the encoding hints from the shared memory and may utilize the encoding hits to efficiently encode the images or video in a single-pass.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
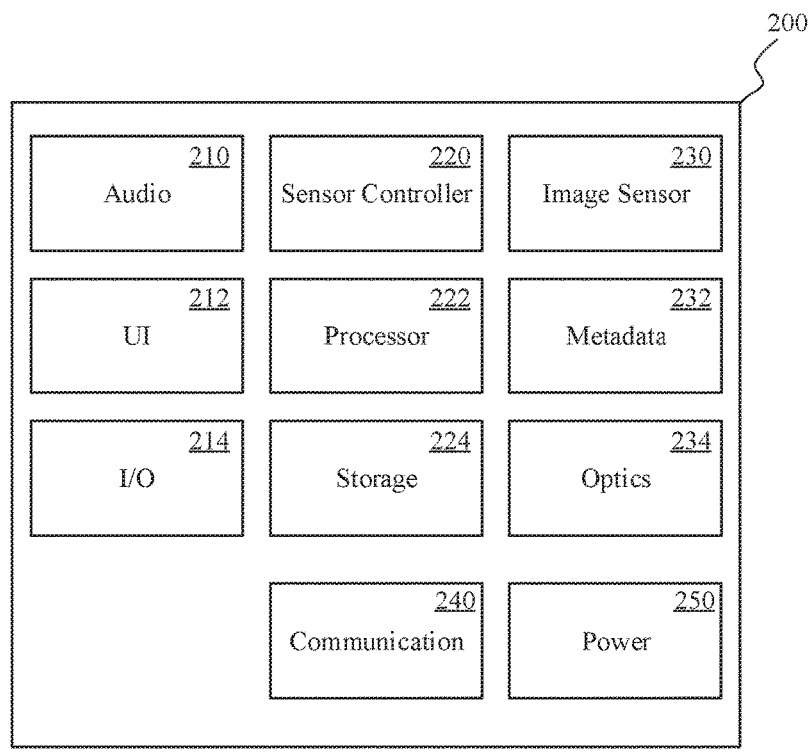
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3:
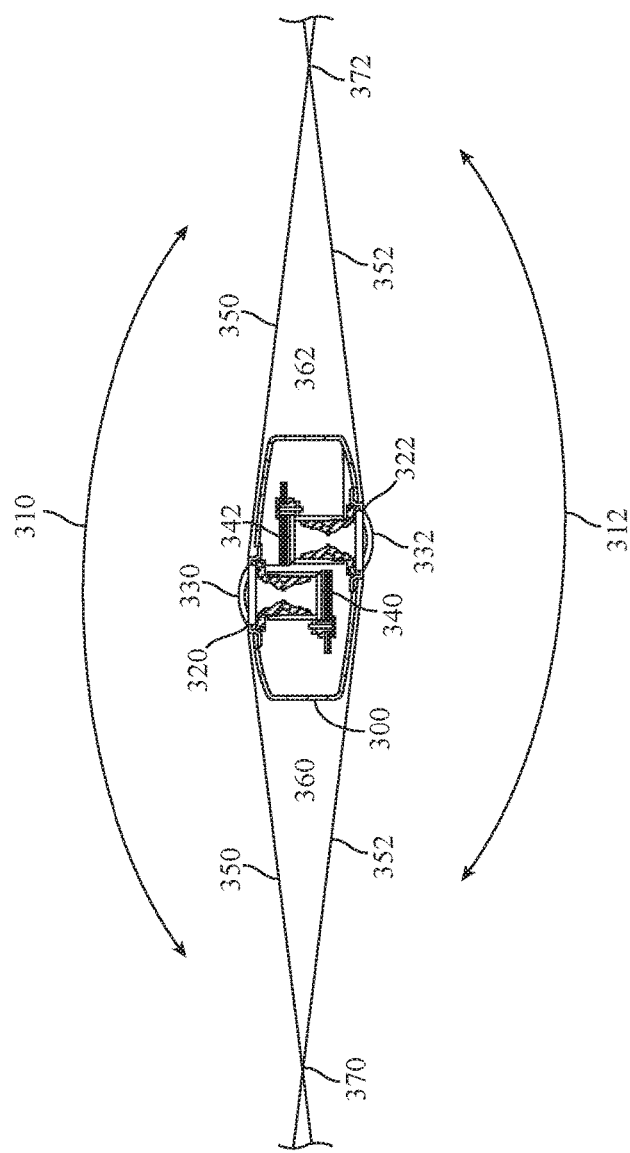
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses (e.g., lenses aligned along the same axis), the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
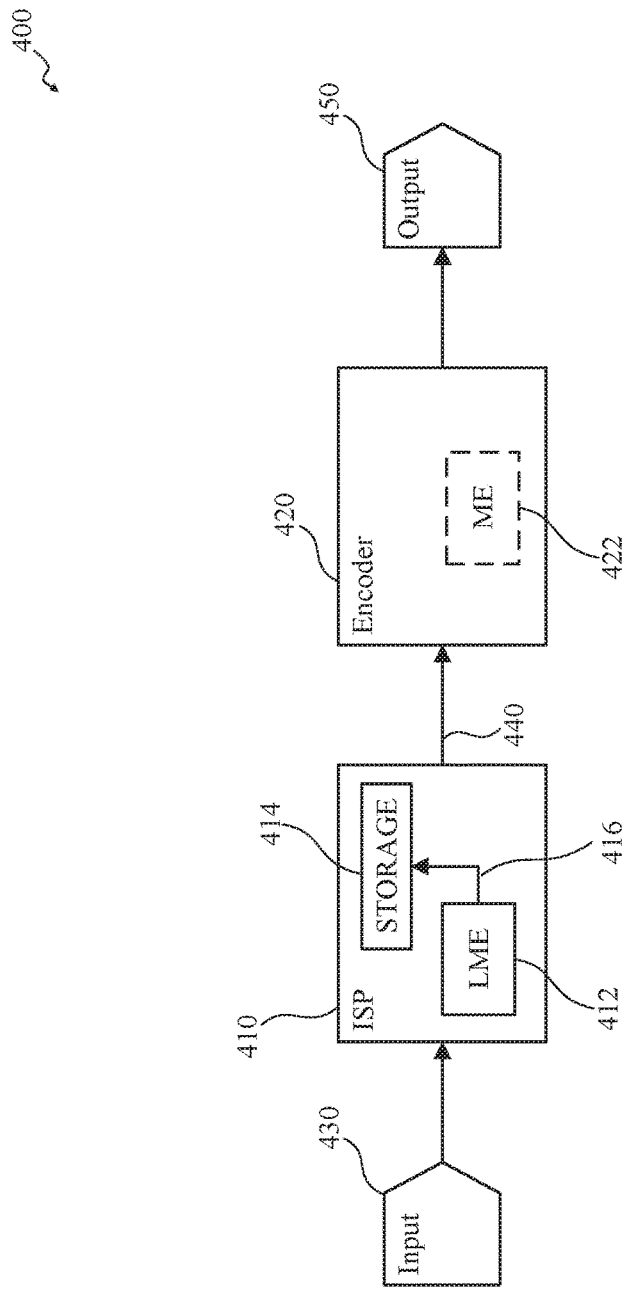
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as 24, 30, or 60 frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks (e.g., having 4×4, 16×16, 64×64, and/or other dimensions). In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors (e.g., an x component and y component of motion) at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include electronic storage 414, such as memory (e.g., random access memory (RAM), flash, or other types of memory). The electronic storage 414 may store local motion estimation information 416 determined by the local motion estimation unit 412 for one or more frames. The local motion estimation information 416 and associated image or images may be output 440 to the encoder 420. In some implementations, the electronic storage 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof. For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
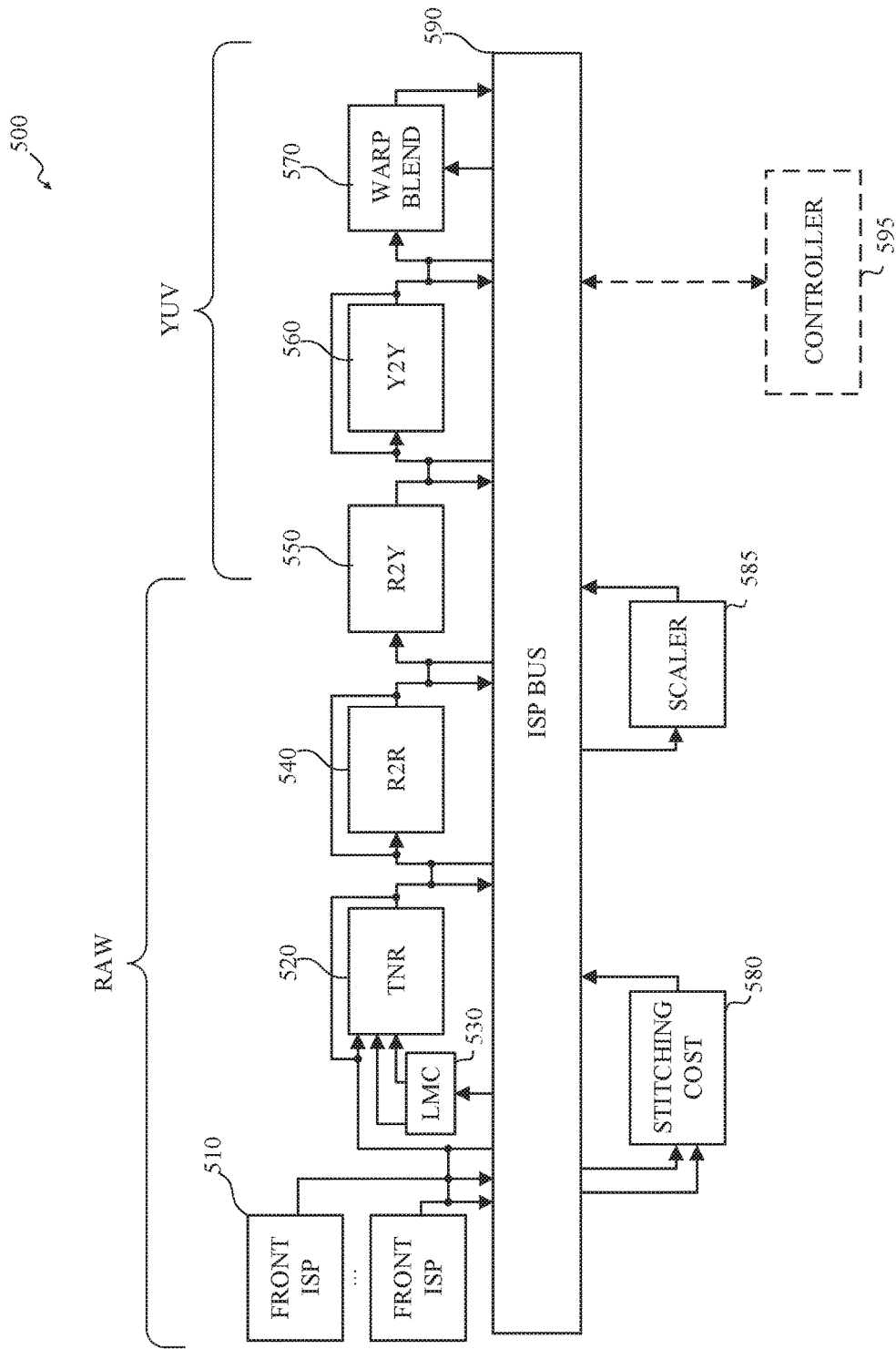
FIG. 5 is a functional block diagram of an example of an image signal processor in accordance with implementations of this disclosure.

FIG. 5 is a functional block diagram of an example of an image signal processor 500 in accordance with implementations of this disclosure. In some implementations, an image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

In some implementations, the image signal processor 500 may receive an image signal, such as from an image sensor, in a defined format, such as a format of the image sensor, which may be referred to herein as "a raw image", "raw image data", "raw data", "a raw signal", or "a raw image signal." For example, the raw image signal may be in a format such as RGB format, which may represent individual pixels using a combination of values or components, such as a red component (R), a green component (G), and a blue component (B). In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

In some implementations, the image signal processor 500 may include a front image signal processor (Front ISP) 510, or multiple front image signal processors as shown, a temporal noise reduction (TNR) unit 520, a local motion compensation unit 530, a raw to raw (R2R) unit 540, a raw to YUV (R2Y) unit 550, a YUV to YUV (Y2Y) unit 560, a combined warp and blend unit 570, a stitching cost unit 580, a scaler 585, an image signal processing bus (ISP BUS) 590, or a combination thereof.

Although not shown expressly in FIG. 5, in some implementations, one or more of the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, the image signal processing bus 590, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a full resolution frame, a low resolution frame, such as a ¼×¼ resolution frame, or both.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with each image capture device.

In some implementations, the temporal noise reduction unit 520 may reduce temporal noise in input images, which may include recursively reducing temporal noise in a sequence of input images, such as a video. Recursive temporal noise reduction may include combining a current image with noise feedback information corresponding to a previously processed frame (recirculated frame). The recirculated frame may be local motion compensated and may be received from the local motion compensation unit 530. The temporal noise reduction unit 520 may generate output including a pixel value and associated noise variance for the pixel value for one or more pixels of the current frame.

In some implementations, the local motion compensation unit 530 may determine motion vectors for the input image and/or video data for representing motion in an image frame, such as motion caused by moving objects in the field-of-view. In some implementations, the local motion compensation unit 530 may apply motion vectors to align a recirculated frame from the temporal noise reduction unit 520 with the incoming, current frame.

In some implementations, the temporal noise reduction unit 520 may reduce temporal noise using three-dimensional (3D) noise reduction (3DNR), such as in conjunction with the local motion compensation unit 530.

In some implementations, the raw to raw unit 540 may perform spatial denoising of frames of raw images based on noise variance values received from the temporal noise reduction unit 520. For example, spatial denoising in the raw to raw unit 540 may include multiple passes of image signal processing, including passes at various resolutions.

In some implementations, the raw to YUV unit 550 may demosaic, and/or color process, the frames of raw images, which may include representing each pixel in the YUV format, which may include a combination of a luminance (Y) component and two chrominance (UV) components.

In some implementations, the YUV to YUV unit 560 may perform local tone mapping of YUV images. In some implementations, the YUV to YUV unit 560 may include multi-scale local tone mapping using a single pass approach or a multi-pass approach on a frame at different scales.

In some implementations, the warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

In some implementations, the warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint. In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

In some implementations, the stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

In some implementations, the scaler 585 may scale images received from the output of the warp and blend unit 570, which may be in patches, or blocks, of pixels such as 16×16 blocks, 8×8 blocks, or patches or blocks of any other size or combination of sizes.

In some implementations, the image signal processing bus 590 may be a bus or interconnect, such as an on-chip interconnect or embedded microcontroller bus interface, for communication between the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, the configuration controller 595, or any combination thereof.

In some implementations, a configuration controller 595 may coordinate image processing by the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
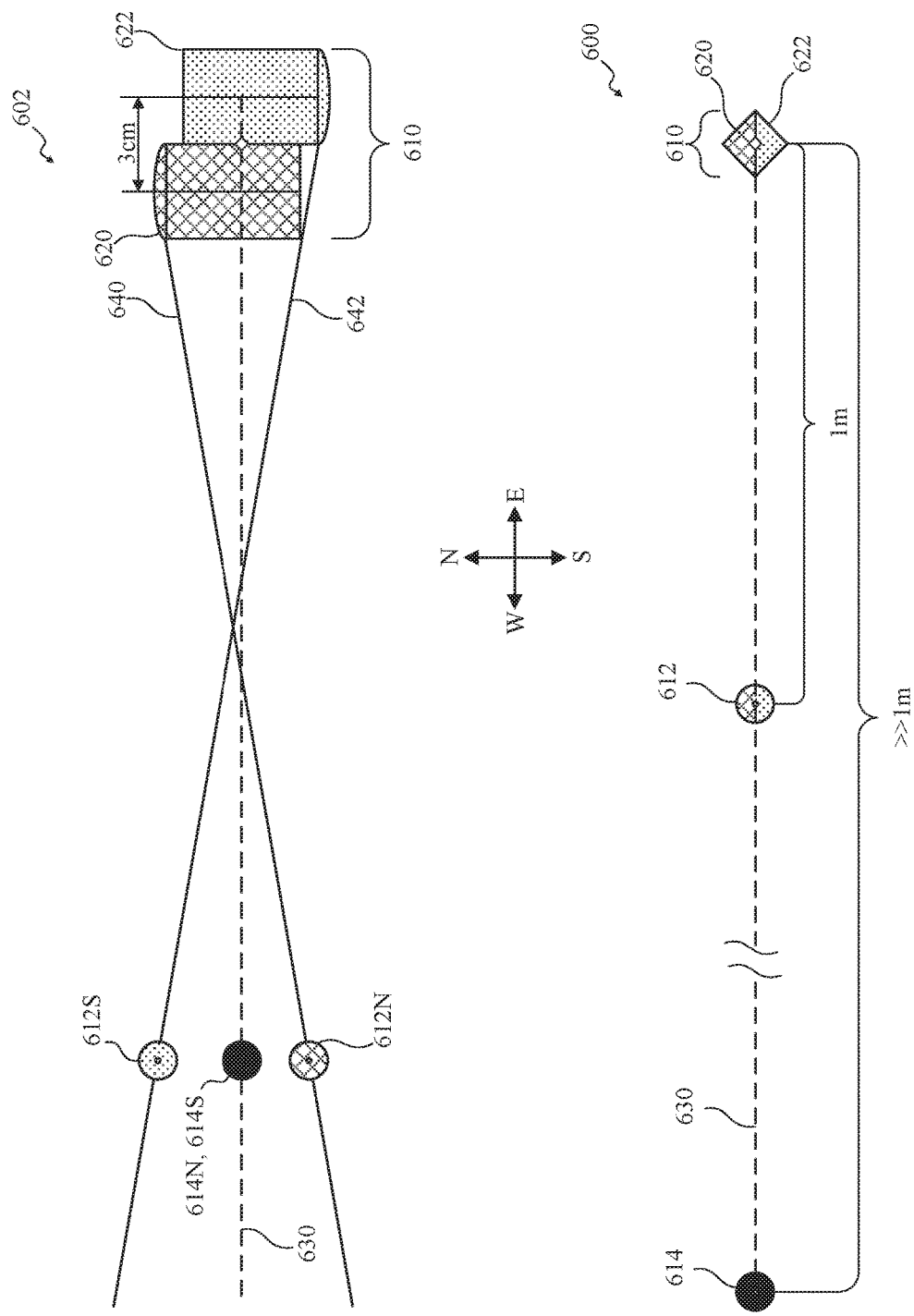
FIG. 6 is a diagram of an example of spatial and field-of-view representations of overlapping field-of-view for adaptive camera model calibration in accordance with implementations of this disclosure.

FIG. 6 is a diagram of an example of spatial and field-of-view representations of overlapping field-of-view for adaptive camera model calibration in accordance with implementations of this disclosure. FIG. 6 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 6 includes a lower portion showing a spatial representation 600 of an image capture apparatus 610 including a near object 612 and a far object 614 and an upper portion showing a corresponding field-of-view representation 602 for the image capture apparatus 610 including near object content 612N as captured by the north facing image capture device 620, near object content 612S as captured by the south facing image capture device 622, far object content 614N as captured by the north facing image capture device 620, and far object content 614S as captured by the south facing image capture device 622.

In the spatial representation 600, the image capture apparatus 610, which may be a multi-face image capture apparatus, such as the image capture apparatus 110 shown in FIG. 1 or the image capture apparatus 300 shown in FIG. 3, is represented by a diamond. In some implementations, the multi-face image capture apparatus 610 may include two or more image capture devices 620, 622, such as the image capture device 200 shown in FIG. 2, which may have overlapping field-of-view. A north facing image capture device 620 is indicated as a triangle with a cross hatched background, and a south facing image capture device 622 is indicated as a triangle with a stippled background. An equator 630, which may be a midpoint between the two image capture devices 620, 622, is indicated by a broken line.

In the spatial representation 600, the near object 612, which may be captured, in whole or in part, in one or more images captured by the image capture devices 620, 622, is shown as a circle, along the equator 630, having a north half with a cross-hatched background and a south half having a stippled background. The near object 612 may be a relatively short distance from the image capture apparatus 610, such as 1 meter (1 m) as shown. The far object 614, which may be captured, in whole or in part, in one or more images captured by the image capture devices 620, 622, is shown as a black circle along the equator 630. The far object 614 may be a relatively long distance from the image capture apparatus 610, such as a distance much greater than 1 meter (>>1 m) as shown. For example, the far object 614 may be near the horizon.

In the field-of-view representation 602, the north facing image capture device 620 is shown on the left of the image capture apparatus 610, facing north, with a cross hatched background, and the corresponding north field-of-view is partially represented as including content above, such as north of, a north field-of-view border line 640. The south facing image capture device 622 of the image capture apparatus 610 is shown on the right, facing south, with a stippled background, and the corresponding south field-of-view is partially represented as including content below, such as south of, a south field-of-view border line 642.

In some implementations, the respective fields-of-view for the image capture devices 620, 622 may include a defined N° longitudinal dimension, such as 360° of longitude, and may include a defined N° lateral dimension, which may be greater than 180° of latitude. For example, the north facing image capture device 620 may have a field-of-view that extends 10° latitude below the equator 630 as represented by the north field-of-view border line 640, and the south facing image capture device 622 may have a field-of-view that extends 10° latitude above the equator 630, as represented by the south field-of-view border line 642. The overlapping region may include 360° of longitude and may include 20° of latitude, which may include a range of 10° north latitude to 10° south latitude.

In some implementations, the image capture devices 620, 622 may be physically offset along one or more spatial axis. For example, as shown in the field-of-view representation 602, the north facing image capture device 620 is offset vertically (north-south) and horizontally. In the example shown in FIG. 6, the horizontal, or longitudinal, offset between the image capture devices 620, 622, or between the respective optical centers of the image capture devices 620, 622, is 3 cm; however, other offsets may be used.

As shown in the spatial representation 600, the near object 612 is positioned along the equator 630 and is positioned relatively proximal to the image capture apparatus 610, such as 1 meter (1 m). The far object 614 is positioned along the equator, and is positioned relatively distal (>>1 m) from the image capture apparatus 610. For simplicity and clarity, the distance of the far object 614 may be, as an example, three kilometers from the spatial center of the image capture apparatus 610 as indicated by the small white diamond in the image capture apparatus 610.

As shown in the field-of-view representation 602, the optical center of the north facing image capture device 620 may be offset from the spatial center of the image capture apparatus 610 horizontally by a defined amount, such as by 1.5 cm west laterally, and vertically by a defined amount, such as by 1.5 cm north longitudinally, and the optical center of the south facing image capture device 622 may be offset from the spatial center of the image capture apparatus 610 horizontally by a defined amount, such as by 1.5 cm east laterally, and vertically by a defined amount, such as by 1.5 cm south longitudinally.

In the field-of-view representation 602, the near object content 612N as captured by the north facing image capture device 620, corresponding to the near object 612 shown in the spatial representation 600, the near object content 612S as captured by the south facing image capture device 622, corresponding to the near object 612 shown in the spatial representation 600, the far object content 614N as captured by the north facing image capture device 620, corresponding to the far object 614 shown in the spatial representation 600, and the far object content 614S as captured by the south facing image capture device 622, corresponding to the far object 614 shown in the spatial representation 600, are shown vertically aligned at an intermediate distance from the image capture apparatus 610 to indicate that distance information for the near object 612 and the far object 614 may be unavailable independent of analyzing the images.

In the field-of-view representation 602, the far object content 614N as captured by the north facing image capture device 620 and the far object content 614S as captured by the south facing image capture device 622 are shown along the equator 630 indicating that the position of the far object content 614N as captured by the north facing image capture device 620 may be indistinguishable from the position of the far object content 614S as captured by the south facing image capture device 622. For example, the far object 614, as shown in the spatial representation 600, may be approximately 2,999.9850000375 meters at an angle of approximately 0.00028648° from the optical center of the north facing image capture device 620 and may be approximately 3,000.0150000375 meters at an angle of approximately 0.00028647° from the optical center of the south facing image capture device 622. The angular difference of approximately one hundred-millionth of a degree between the location of the far object 614 relative to the optical center of the north facing image capture device 620 and the location of the far object 614 relative to the optical center of the south facing image capture device 622 may correspond to a difference of zero pixels in the corresponding images.

The position of the near object 612 may differ in the respective images captured by the image capture devices 620, 622. In the field-of-view representation 602, the near object content 612N as captured by the north facing image capture device 620 is shown with a cross-hatched background below the equator 630 indicating that the position of the near object content 612N as captured by the north facing image capture device 620 may be slightly below the equator 630, such as 1° south latitude, and the near object content 612S as captured by the south facing image capture device 622 is shown with a stippled background above the equator 630 indicating that the position of the near object content 612S as captured by the south facing image capture device 622 may be slightly above the equator 630, such as 1° north latitude. For example, the near object 612, as shown in the spatial representation 600, may be approximately 1.01511083 meters at an angle of approximately 0.846674024° from the optical center of the north facing image capture device 620, and may be approximately 0.985114207 meters at an angle of approximately 0.872457123° from the optical center of the south facing image capture device 622. The angular difference of approximately 1.72° between the location of the near object 612 relative to the optical center of the north facing image capture device 620 and the location of the near object 612 relative to the optical center of the south facing image capture device 622 may correspond to a difference of one or more pixels in the corresponding images.

In some implementations, images captured by the image capture devices 620, 622 may be combined to generate a combined image wherein overlapping regions and transitions between overlapping regions, such as portions corresponding to field-of-view boundaries 640, 642, are visually cohesive. In some implementations, combining images may include aligning overlapping regions of the images to adjust for differences between the relative locations of the respective image capture devices 620, 622 and the content captured by the images. In some implementations, aligning overlapping regions of images may be based on the physical alignment of the respective image capture devices 620, 622 of the image capture apparatus 610, the distance between the respective image capture devices 620, 622 of the image capture apparatus 610 and the content captured by the images, or both. An example of image alignment is shown in FIG. 7.

Figure 7:
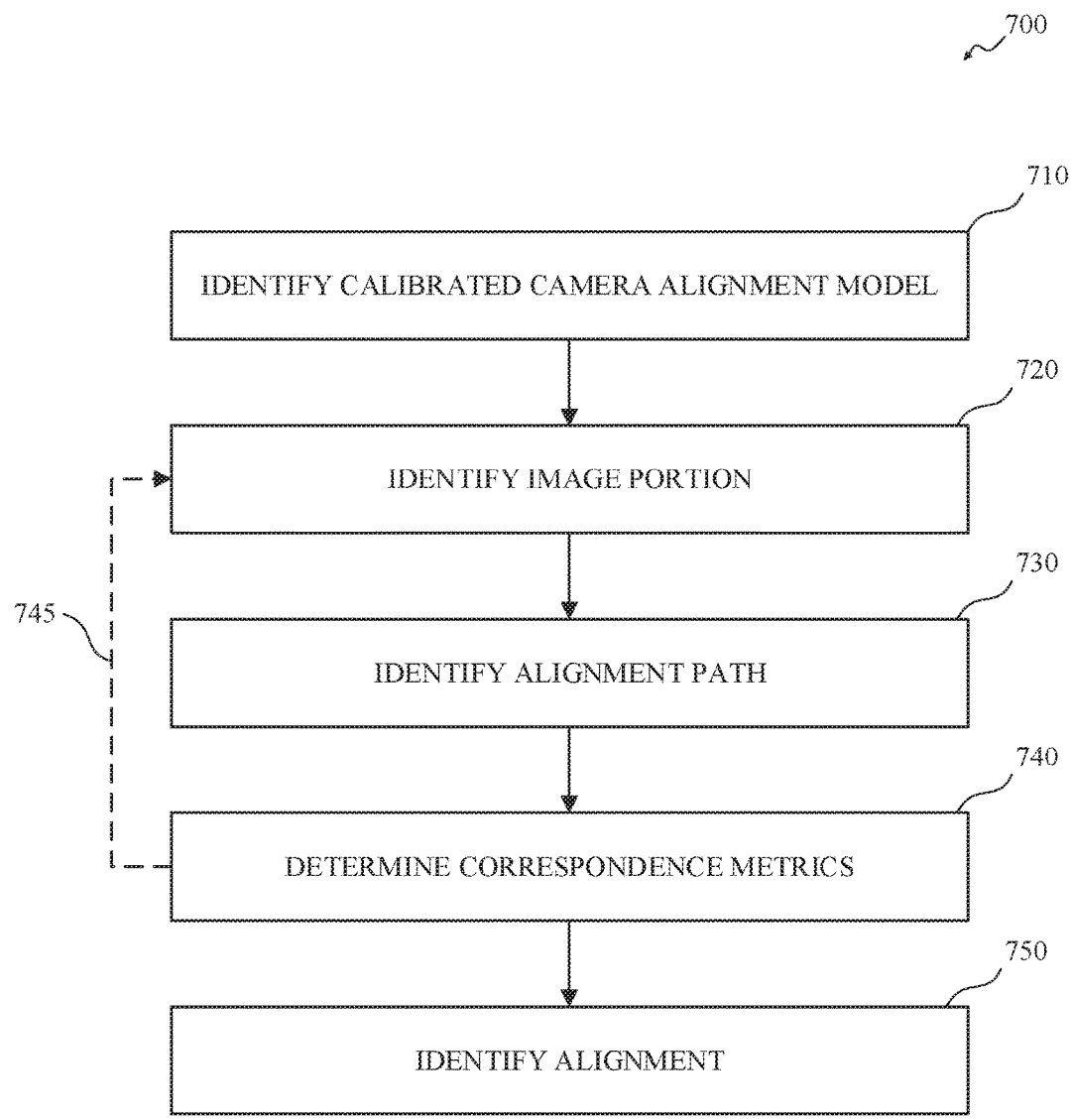
FIG. 7 is a flowchart of an example of aligning overlapping image regions in accordance with implementations of this disclosure.

FIG. 7 is a flowchart of an example of aligning overlapping image regions 700 in accordance with implementations of this disclosure. In some implementations, aligning overlapping image regions 700 may be implemented in an image capture apparatus, such as the image capture apparatus 110 shown in FIG. 1, the image capture apparatus 300 shown in FIG. 3, or the image capture apparatus 610 shown in FIG. 6. For example, a stitching cost unit, such as the stitching cost unit 580 of the image signal processor 500 shown in FIG. 5, may implement aligning overlapping image regions 700. In some implementations, aligning overlapping image regions 700 may include identifying a calibrated camera alignment model at 710, identifying image portions corresponding to defined relative space at 720, identifying an alignment path at 730, determining correspondence metrics at 740, identifying an alignment at 750, or a combination thereof.

Although not shown separately in FIG. 7, an image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, and may identify one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and each input image or frame may be associated with respective temporal information.

In some implementations, a calibrated camera alignment model may be identified at 710. In some implementations, an image capture apparatus may include a memory, such as the electronic storage unit 224 shown in FIG. 2 or the electronic storage 414 shown in FIG. 4, and a calibrated camera alignment model may be read from the memory, or otherwise received by the image capture apparatus. For example, the calibrated camera alignment model may be a previously generated calibrated camera alignment model, such as a calibrated camera alignment model calibrated based on one or more previously captured images or frames.

A camera alignment model for image capture devices having overlapping fields-of-view may indicate an expected correspondence between the relative spatial orientation of the fields-of-view and portions, such as pixels, in overlapping regions of corresponding images captured by the image capture devices. The relative spatial orientation of the fields-of-view may correspond with a physical alignment of the respective image capture devices and may be expressed in terms of relative longitude and latitude.

In some implementations, a camera alignment model may include one or more parameters for use in aligning the overlapping images. For example, a camera alignment model may indicate one or more portions, such as pixels, of an overlapping region of an image, one or more of which is expected to correspond with a defined relative longitude. For example, the one or more portions may be expressed as a path of pixels, each pixel corresponding to a respective relative latitude, on or near a defined longitude, which may be referred to herein as an alignment path, or epipolar. In some implementations, the calibrated camera alignment model may vary based on image resolution.

In some implementations, the correspondence between the expected relative alignment of the overlapping fields-of-view captured by respective images of an image capture apparatus and the respective images may be described by a camera alignment model and may be referred to herein as the defined relative space. For example, a camera alignment model may indicate a portion, such as a pixel, of a first image that is expected to correspond with a defined location in the defined relative space, such as at the relative prime meridian (0° relative longitude) and the relative equator (0° relative latitude), and may indicate a corresponding portion, such as a corresponding pixel, of the second image that is expected to align with the pixel in the first image at the defined location, conditioned on the distance of the content captured at the respective portions of the images being greater than a threshold, wherein the threshold indicates a maximum distance from the image capture apparatus for which angular distances translate to pixel differences.

In some implementations, an expected camera alignment model may indicate an expected alignment of image capture devices, which may differ from the physical alignment of the image capture devices concurrent with capturing images. A calibrated camera alignment model may be a camera alignment model, such as an expected camera alignment model, calibrated based on captured images to correspond with the contemporaneous physical alignment of the image capture devices.

In some implementations, one or more image portions corresponding to defined relative space may be identified at 720. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 730. The alignment path, or epipolar, may indicate a path, which may be vertical, or approximately vertical, from the point identified at 720 to a point along the edge of the image. In some implementations, the alignment path, or epipolar, may be a path along the longitude of the point identified at 720. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame. In some implementations, an alignment path may begin at a first end, such as at a location, which may be a portion, such as a pixel, of the image, along, or proximate to, a defined relative longitude, such as the relative prime meridian, and a defined relative latitude, such as the relative equator, of an image, end at a second end, such as at a location, which may be a portion, such as a pixel, of the image, along, or proximate to, the defined relative longitude and the edge of an image which may be distal from the relative equator with respect to the optical center of the image capture device.

In some implementations, one or more correspondence metrics may be determined at 740. In some implementations, a group, or block, such as a 13×13 block of pixels, centered on the first pixel identified at 720 may be identified from the first image, and a group, or block, such as a 13×13 block of pixels, centered on the second pixel identified at 720 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks.

In some implementations, determining the correspondence metrics may include determining a match quality metric for each point along the alignment paths, which may be performed iteratively or in parallel. For example, a match quality metric may be determined for the two blocks corresponding to the current relative longitude and the relative equator (0° relative latitude), and a second match quality metric may be determined for two blocks corresponding to a respective point, or pixel, in each frame along the current alignment path and defined distance, such as 0.1° latitude, toward the edge of the respective frame, which may be 0.1° north in the south frame and 0.1° south in the north frame. Respective match quality metrics, such as approximately 150 match quality metrics, may be determined for blocks at each point, or pixel, along the respective alignment paths, at defined latitude distance intervals. In some implementations, a two-dimensional (2D) cost map may be generated. A first dimension of the two-dimensional cost map may indicate a longitude for a respective match quality metric. A second dimension of the two-dimensional cost map may indicate a number, or cardinality, of pixels (spatial difference) between the corresponding pixel and the point, or pixel, at the origin of the alignment path, which may be referred to herein as a disparity. A value of the two-dimensional cost map for an intersection of the first and second dimensions of the two-dimensional cost map may be the corresponding match quality metric. Although the blocks in the two frames are described as being at corresponding, or symmetrical, latitude positions along the respective alignment paths, in some implementations, other correspondence metrics may be determined. For example, a correspondence metric may be determined based on differences between points along the alignment path in one frame and one or more points at different latitudes along the alignment path in the other frame.

In some implementations, identifying image portions corresponding to defined relative space at 720, identifying an alignment path at 730, determining correspondence metrics at 740, or a combination thereof, may be performed for two or more longitudes as indicated by the broken line at 745. For example, identifying image portions corresponding to defined relative space at 720, identifying an alignment path at 730, and determining correspondence metrics at 740 may be performed for each defined longitudinal distance, such as each 0.5° of longitude, or a defined pixel distance corresponding to a defined longitudinal distance as a function of a resolution of the captured images.

Figure 8:
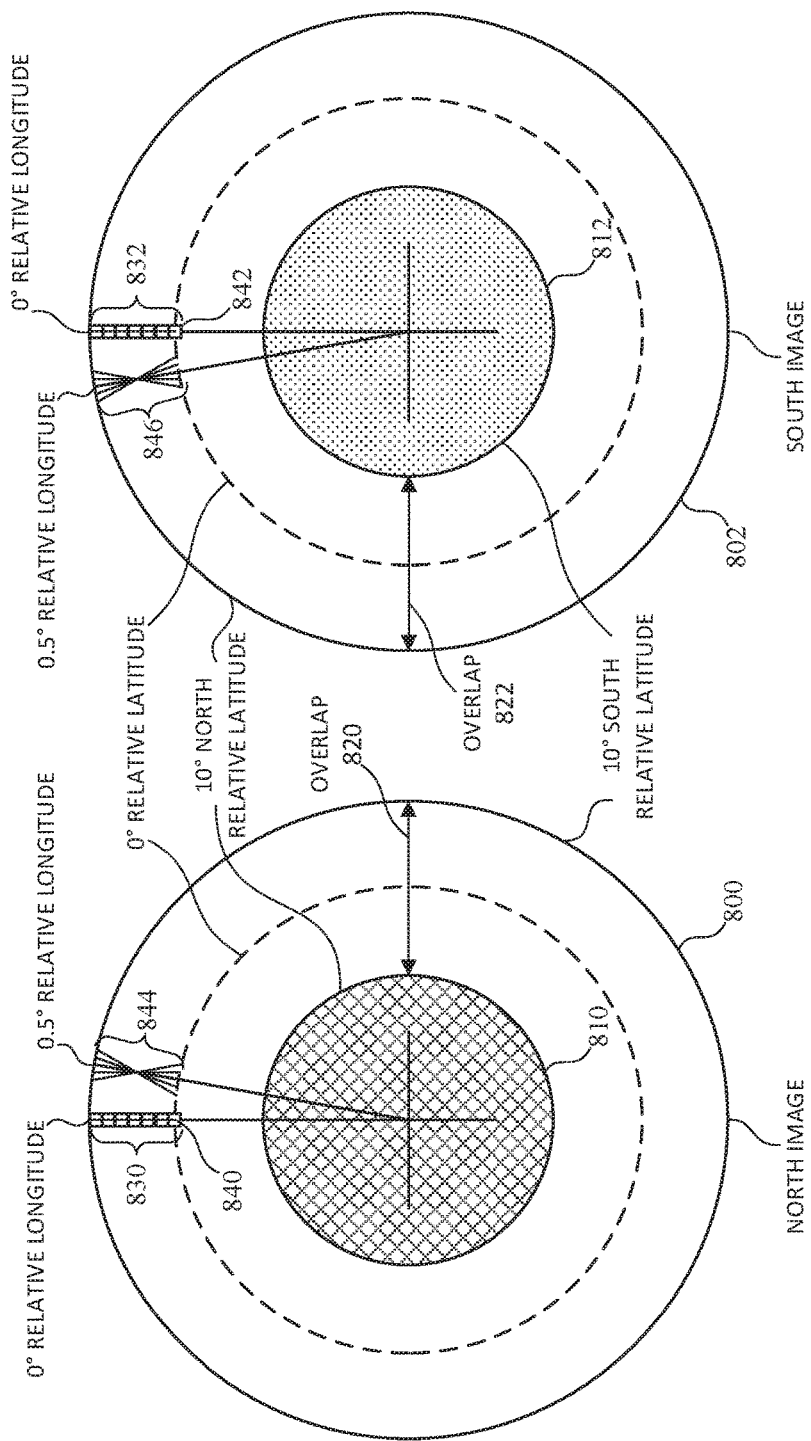
FIG. 8 is a diagram of elements of aligning overlapping image regions in accordance with this disclosure.

In some implementations, an alignment for the current images may be identified at 750. In some implementations, identifying the alignment for the current images at 750 may include simultaneously optimizing the correspondence metrics and a smoothness criterion. For example, identifying the alignment for the current images at 750 may include identifying one or more disparity profiles from the correspondence metrics, such as from the cost map generated at 740. A disparity profile from the correspondence metrics may include a discrete per longitude sequence of match quality metrics. For example, a disparity profile may include, for each longitude, such as each 0.5° of longitude, a disparity and a corresponding match quality metric. Optimizing the correspondence metrics may include identifying the minimal match quality metric for each longitude. Optimizing the smoothness criterion may include minimizing a sum of absolute differences in the disparity between adjacent longitudes. Simultaneously optimizing may include identifying a disparity profile representing a latitude per longitude evaluated, having a minimal cost, which may be a sum of match quality metrics, subject to the smoothness criterion. For example, a difference between the disparity corresponding to a minimal match quality metric for a longitude and the disparity corresponding to a minimal match quality metric for an adjacent longitude may exceed a defined threshold, which may indicate that the low match quality metric represents a false positive, and the second smallest match quality metric for one or both of the longitudes may be used. An example of elements of aligning overlapping image regions is shown in FIG. 8.

In some implementations, identifying the disparity profile may include generating disparity profiles at multiple scales, which may include generating match cost metrics at each of a defined set of scales. In some implementations, the disparity profile may be identified based on a low resolution frame, such as low resolution frame generated by the front image signal processor 510 shown in FIG. 5.

In some implementations, simultaneously optimizing the correspondence metrics and a smoothness criterion may include determining a weighted sum of the correspondence metrics and the smoothness criterions for each respective disparity profile and identifying the minimal weighted sum as the simultaneously optimized disparity profile. For example, simultaneously optimizing may include, for a disparity profile (p), determining a sum of the match quality metrics along the disparity profile as a first cost (c1), determining a sum of the absolute difference between successive disparity values as a cost (c2), and determining a simultaneously optimized disparity profile ($p_{so}$) using a first weight (w1) representing the relative importance of the first cost and a second weight (w2) representing a relative importance of the second cost, which may be expressed as $p_{so}$=w1*c1+w2*c2. Although weighted averaging is described herein, other combining functions may be used.

For example, 724 longitudes may be evaluated in each frame, which may include determining correspondence metrics for 724 alignment paths, which may be approximately one alignment path per 0.5° longitude for 360°, determining correspondence metrics for each alignment path may include determining 150 match quality metrics, which may correspond to 150 latitudes evaluated per longitude evaluated, which may be approximately one match quality metric per 0.1° latitude for 10°, determining the correspondence metrics may include determining 108600 (724*150) match quality metrics, and simultaneously optimizing may include identifying a disparity profile including 724 of the 108600 match quality metrics.

In an example, content captured by the overlapping regions of the image capture devices along the equator far, such as three kilometers, from the image capture apparatus, may correspond with match quality metrics corresponding to a relatively small disparity, such as zero, which may correspond to a position at or near the equator, and content captured by the overlapping regions of the image capture devices along the equator near, such as one meter, to the image capture apparatus, may correspond with match quality metrics corresponding to a relatively large disparity, such as a disparity corresponding to a position at or near the edge of the images, such as at 10° latitude.

FIG. 8 is a diagram of elements of aligning overlapping image regions in accordance with this disclosure. FIG. 8 shows a north circular frame 800 and a south circular frame 802. The north circular frame 800 includes a non-overlapping region 810 indicated with a cross-hatched background, and an overlapping region 820. The south circular frame 802 includes a non-overlapping region 812 indicated with a stippled background, and an overlapping region 822. In some implementations, the longitudes in a frame, such as the north frame 800 as shown, may be oriented clockwise, and the longitudes in a corresponding frame, such as the south frame 802 as shown, may be oriented counterclockwise.

The overlapping regions 820, 822 of the north circular frame 800 and the south circular frame 802 may be aligned as shown in FIG. 7. For example, in the north circular frame 800, blocks 830, such as a 13×13 block of pixels, may be identified along an alignment path 840 beginning at 0° relative longitude and 0° relative latitude and ending along the edge of the frame 800, which may be at a distal relative latitude, such as 10° south latitude, as shown. In the south circular frame 802, corresponding blocks 832 may be identified along a corresponding alignment path 842 beginning at 0° relative longitude and 0° relative latitude and ending along the edge of the frame 802, which may be at 10° north latitude, as shown. Correspondence metrics may be determined based on differences between the identified blocks 830 from the north circular frame 800 and the spatially corresponding blocks 832 from the south circular frame 802.

In the north circular frame 800, candidate alignment paths 844 are shown for the 0.5° relative longitude, each path beginning at 0° relative latitude and ending along the edge of the north circular frame 800, to indicate that correspondence metrics may be determined at each defined distance longitudinally and to indicate that for each respective longitude, multiple candidate alignment paths 844 may be evaluated. For example, a first candidate alignment path from the candidate alignment paths 844 may be orthogonal to the equator, which may be aligned along the respective longitude, and each other candidate alignment path from the candidate alignment paths 844 may be angularly offset relative to the longitude as shown. FIG. 8 is not to scale. Although the blocks are shown as adjacent, the blocks may overlap horizontally, vertically, or both. Although seven blocks and two alignments paths are shown for simplicity, any number of blocks and alignment paths may be used. For example, 724 alignment paths, which may correspond with approximately 0.5° longitudinal intervals, may be used, and 150 blocks per alignment path, which may correspond with approximately 0.1° latitude intervals, may be used. Corresponding candidate alignment paths 846 are shown in the south circular frame 802. In some implementations, a number, or cardinality, of points, such as pixels, indicated by each respective candidate alignment path 844 may be a defined cardinality, such as 150 points, and each respective point from a candidate alignment path 844 may be offset, or shifted, from a corresponding point in another candidate alignment path 844 parallel to the equator. In some implementations, a candidate alignment path 844, or a portion thereof, for a longitude may overlap a candidate alignment path, or a portion thereof, for an adjacent longitude.

In some implementations, a camera alignment model may be based on the physical orientation of elements of the image capture device, such as the physical alignment of lenses, image sensors, or both. Changes in the physical orientation of elements of one or more of the image capture devices having overlapping fields-of-view may cause misalignment such that aligning overlapping image regions, such as the aligning overlapping image regions 700 shown in FIG. 7, based on a misaligned camera alignment model may inaccurately or inefficiently align image elements, such as pixels. For example, misalignment of image capture devices may occur during fabrication such that the alignment of image capture devices having overlapping field-of-view may differ from an expected alignment. In another example, the physical orientation of elements of an image capture device may change, such as in response to physical force, temperature variation, material aging or deformation, atmospheric pressure, or any other physical or chemical process, or combination of processes, that may change image capture device alignment. In some implementations, camera alignment model calibration may include updating, adjusting, or modifying a camera alignment model based on identified changes in the physical orientation of elements of one or more of the respective image capture devices. An example of camera alignment model calibration is shown in FIG. 9.

Figure 9:
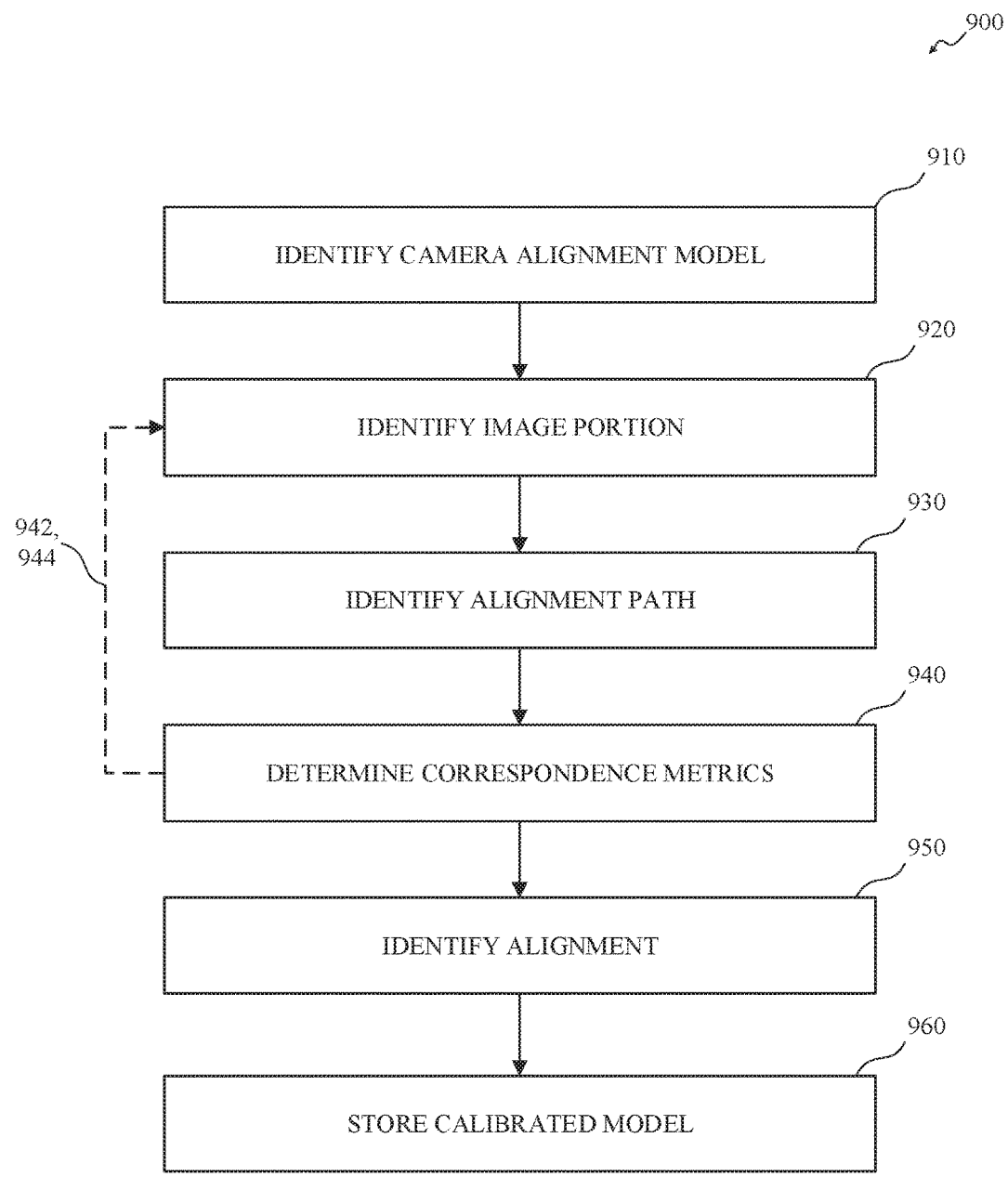
FIG. 9 is a flowchart of an example of a method of camera alignment model calibration in accordance with implementations of this disclosure.

FIG. 9 is a flowchart of an example of a method of camera alignment model calibration 900 in accordance with implementations of this disclosure. In some implementations, camera alignment model calibration 900 may include adaptively detecting image capture device misalignment and generating or modifying a camera alignment model to maintain or restore the alignment of defined elements in overlapping images, such that overlapping image regions may be combined to form a visually cohesive combined image.

In some implementations, camera alignment model calibration 900 may be performed periodically, in response to an event, or both. For example, camera alignment model calibration 900 may be performed periodically, at a camera alignment calibration rate, such as once per unit time, such as once per second, which may be less than half the frame rate of the input video. In some implementations, the camera alignment calibration rate may be one one-hundredth of the frame rate. In another example, camera alignment model calibration 900 may be performed in response to an event, such as capturing a defined number of frames, such as 30 frames or 60 frames, which may correspond to a frame-rate for captured video, in response to an expiration of a timer, in response to starting, such a powering on, or resetting, an image capture apparatus, in response to input, such as user input, indicating camera alignment model calibration, in response to detecting kinetic force exceeding a defined threshold, in response to detecting a misalignment of overlapping image regions, or any other event, or combination of events, capable of triggering camera alignment model calibration 900.

In some implementations, camera alignment model calibration 900 may be implemented in an image capture apparatus, such as the image capture apparatus 110 shown in FIG. 1, the image capture apparatus 300 shown in FIG. 3, or the image capture apparatus 610 shown in FIG. 6. In some implementations, camera alignment model calibration 900 may be similar to aligning overlapping image regions 700 as shown in FIG. 7, except as described herein. For example, a calibration controller, such as the calibration controller 595 shown in FIG. 5, may implement camera alignment model calibration 900. In another example, aligning overlapping image regions as shown at 700 in FIG. 7 may include identifying one alignment path per longitude evaluated, which may be referred to herein as including a one-dimensional (1D) search, and camera alignment model calibration 900 as shown in FIG. 9 may include identifying a set of candidate alignment paths per longitude evaluated, which may be referred to herein as including a two-dimensional search.

In some implementations, camera alignment model calibration 900 may include identifying a camera alignment model at 910, identifying image portions corresponding to defined relative space at 920, identifying an alignment path at 930, determining correspondence metrics at 940, identifying an alignment at 950, storing a recalibrated camera alignment model at 960, or a combination thereof. In some implementations, camera alignment model calibration 900 may be performed in independently of, or in conjunction with, generating a combined image, such as generating a combined image based on two or more images captured by image capture devices having overlapping fields-of-view. For example, a combined image may be generated based on two or more images captured by image capture devices having overlapping fields-of-view, and, independently, camera alignment model calibration 900 may be performed based on the two or more images.

In some implementations, a camera alignment model, such as a calibrated camera alignment model may be identified at 910. In some implementations, identifying the camera alignment model at 910 may be similar to identifying a calibrated camera alignment model at 710 as shown in FIG. 7. For example, a multi-face capture apparatus, such as the image capture apparatus 110 shown in FIG. 1, the image capture apparatus 300 shown in FIG. 3, or the image capture apparatus 610 shown in FIG. 6, may include a memory, such as the electronic storage unit 224 shown in FIG. 2 or the electronic storage 414 shown in FIG. 4, and a camera alignment model may be read from the memory, or otherwise received by the image capture apparatus. In some implementations, a calibrated camera alignment model may be a previously calibrated camera alignment model identified based on a previous camera alignment model calibration 900. In some implementations, the image capture apparatus, or a component thereof, such as an image signal processor, may receive calibration parameters, such as from another component to the image capture apparatus. In some implementations, one or more calibration parameters, such as white balance, focus, exposure, flicker adjustment, or the like, may be automatically adjusted in accordance with this disclosure.

Although not shown separately in FIG. 9, in some implementations, the calibrated camera alignment model may be a camera alignment model generated in conjunction with fabrication of the image capture apparatus. For example, the image capture apparatus may be fabricated such that the respective axes of individual image capture devices, such as the image capture device 200 shown in FIG. 2, are physically aligned within a defined fabrication alignment tolerance of an expected fabrication alignment, and an expected fabrication alignment model may indicate an expected mechanical alignment, which may include an expected angular, or rotational, alignment; an expected longitudinal, x-axis, or horizontal, displacement; an expected lateral, y-axis, or vertical, displacement; an expected elevation, z-axis, or depth, displacement; or a combination thereof, between respective image sensors having overlapping fields-of-view. In some implementations, the expected angular alignment may include an expected alignment along a longitudinal, horizontal, or x-axis; a lateral, vertical, or y-axis; an elevation, depth, or z-axis; or a combination thereof. For example, in a multi-face image capture apparatus, such as the image capture apparatus 110 shown in FIG. 1, two image capture devices may have overlapping fields-of-view, the expected angular alignment may indicate that the x-axis and the z-axis of a first image capture device are 90° from the corresponding y-axis and the corresponding z-axis of a second image capture device, and the y-axis of the first image capture device may be parallel to the x-axis of the second image capture device. In some implementations, a fabrication misalignment may be identified, which may indicate a determined difference in camera alignment between the physical alignment of image capture devices as fabricated and the expected alignment, such as a difference within the defined fabrication alignment tolerance. In some implementations, identifying the fabrication misalignment may include capturing overlapping images of reference content; identifying a spatial location in the overlapping regions of the respective images that captured the reference content, which may be related to a distance between the content captured and the respective image capture devices; and determining a difference between an expected spatial location of the reference content in each captured image and the identified spatial location of the reference content.

Although not shown separately in FIG. 9, in some implementations, camera alignment model calibration 900 may include storing frames captured by a multi-camera array, such as a six-camera cubic array, in a multi-dimensional array, such as a two-dimensional 2×3 array. Storing the frames may be performed prior to camera alignment model calibration 900, prior to generating a combined frame, or both. In some implementations, the six-camera cubic array may include a top image capture device, a right image capture device, a bottom image capture device, a front image capture device, a left image capture device, and a rear image capture device. The 2×3 array may include top storage portions (0,0; 0,1; 0,2) and bottom storage portions (1,0; 1,1; 1,2). Frames captured by the top image capture device, the right image capture device, and the bottom image capture device may be stored in the top storage portions (0,0; 0,1; 0,2), and frames captured by the front image capture device, the left image capture device, and the rear image capture device may be stored in the bottom storage portions (1,0; 1,1; 1,2).

In some implementations, subsequent to identifying the camera alignment model at 910, the physical alignment of one or more image capture devices of an image capture apparatus may change. For example, physical components, such as structural components or materials, of one or more image capture devices, the image capture apparatus, or both may expand, contract, warp, or a combination thereof, in response to changes, such as variations in temperature, aging, physical force, or a combination thereof, which may cause image capture device misalignment. For example, a one micron change in image capture device alignment may cause a single pixel discrepancy between the image capture devices.

In some implementations, one or more image portions corresponding to defined relative space may be identified at 920. Identifying image portions at 920 may be similar to identifying image portions at 720 as shown in FIG. 7, except as described herein. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 930. Identifying an alignment path at 930 may be similar to identifying an alignment path at 730 as shown in FIG. 7, except as described herein. The alignment path, or epipolar, may indicate a path, which may be vertical, or approximately vertical, from the point identified at 920 to a point along the edge of the image, such as a point at a distal relative latitude. In some implementations, the alignment path, or epipolar, may be a path along the longitude of the point identified at 920. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame.

In some implementations, one or more correspondence metrics may be determined at 940. Identifying correspondence metrics at 940 may be similar to identifying correspondence metrics at 740 as shown in FIG. 7, except as described herein. In some implementations, a group, or block, such as a 13×13 block of pixels, centered on the first pixel identified at 920 may be identified from the first image, and a group, or block, such as a 13×13 block of pixels, centered on the second pixel identified at 920 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks. In some implementations, determining the correspondence metrics may include determining a match quality metric for each point along the alignment paths, which may be performed iteratively or in parallel.

In some implementations, identifying image portions corresponding to defined relative space at 920, identifying an alignment path at 930, determining correspondence metrics at 940, or both may be performed for a set of candidate alignment paths for a longitude as indicated by the broken line at 942. A first candidate alignment path from the set of candidate alignment paths may be orthogonal to the equator, which may be aligned along the respective longitude, and each other candidate alignment path from the set of candidate alignment paths may be angularly offset relative to the longitude. The degree of angular offset for each candidate alignment path may be a defined angular difference from the degree of angular offset for each other candidate alignment path from the set of candidate alignment path for a longitude. For example, a candidate image portion along a candidate alignment path may be a 13×13 block of pixels, and the degree of angular offset for each other candidate alignment path from the set of candidate alignment path for a longitude may correspond with a spatial difference of six pixels.

For example, a first candidate image portion corresponding to a point, or pixel, along the identified longitude may be identified as indicated at 920, a first candidate alignment path may be identified originating at the first candidate image portion as indicated at 930, and first correspondence metrics may be determined for the first candidate alignment path as indicated at 940; a second candidate image portion corresponding to a point, or pixel, longitudinally, or horizontally, adjacent to the identified longitude, such as a point along the latitude of the first candidate image portion and within a defined spatial distance, such as one pixel, from the identified longitude, in a first direction, such as left or right may be identified, a second candidate alignment path may be identified originating at the second candidate image portion as indicated at 930, and second correspondence metrics may be determined for the second candidate alignment path as indicated at 940; and a third candidate image portion corresponding to a point, or pixel, longitudinally, or horizontally, adjacent to the identified longitude, such as a point along the latitude of the first candidate image portion and within a defined spatial distance, such as one pixel, from the identified longitude, in a second direction, opposite the direction of the second candidate image portion, such as right or left of the first identified image portion may be identified, a third candidate alignment path may be identified originating at the third candidate image portion as indicated at 930, and third correspondence metrics may be determined for the third candidate alignment path as indicated at 940. Although three candidate alignment paths are described herein, any number of candidate alignment paths may be used.

In another example, an alignment path may extend from a location, such as a pixel, in a frame corresponding to a relative longitude and an equator, which may be a midpoint between the field-of-view of the image capture device and the overlapping field-of-view of the adjacent image capture device. The path may extend to a location, such as a pixel, in the frame at an edge of the frame. At a latitude along the path, a longitude of the path may differ from the relative longitude by an amount corresponding to an expected relative orientation of the image capture device and the adjacent image capture device, which may be indicated by the camera alignment model. The alignment path may be identified as a first candidate alignment path, and a second alignment path may be identified corresponding to the first alignment path and longitudinally offset from the first alignment path.

In some implementations, identifying image portions corresponding to defined relative space at 920, identifying an alignment path at 930, determining correspondence metrics at 940, or a combination thereof, may be performed for two or more longitudes as indicated by the broken line at 944. For example, identifying image portions corresponding to defined relative space at 920, identifying an alignment path at 930, and determining correspondence metrics at 940 may be performed for each defined longitudinal distance, such as each 0.5° of longitude, or a defined pixel distance corresponding to a defined longitudinal distance as a function of a resolution of the captured images.

In some implementations, an alignment for the current images may be identified at 950. Identifying the alignment for the current images at 950 may be similar to identifying the alignment for the current images at 750 as shown in FIG. 7, except as described herein. In some implementations, identifying the alignment for the current images at 950 may include simultaneously optimizing the correspondence metrics, which may include the correspondence metrics for each candidate alignment path, and a smoothness criterion. A disparity profile from the correspondence metrics may include a discrete per longitude sequence of match quality metrics, wherein each match quality metric for a longitude may correspond to one of the candidate alignment paths for the longitude. Simultaneously optimizing may include identifying a disparity profile representing a latitude per longitude evaluated, having a minimal cost, which may be a sum of match quality metrics, subject to the smoothness criterion.

For example, 724 longitudes may be evaluated in each frame, which may include determining correspondence metrics for 724 alignment paths, which may be approximately one alignment path per 0.5° longitude for 360°; 150 match quality metrics may be determined for each alignment path, which may include three candidate alignment paths per longitude, which may correspond to 450 (3*150) latitudes evaluated per longitude evaluated, which may be approximately three match quality metrics per 0.1° latitude for 10°, and determining the correspondence metrics may include determining 325800 (724*3*150) match quality metrics.

In some implementations, a calibrated, or recalibrated, camera alignment model may be generated and stored at 960. Generating the calibrated camera alignment model may include calibrating the camera alignment model identified at 910 based on the disparity profile identified at 950. For example, for a longitude the camera alignment model identified at 910 may indicate an alignment path, the disparity profile identified at 950 may indicate a candidate alignment path that differs from the alignment path for the longitude indicated by the camera alignment model identified at 910, and the calibrated camera alignment model may update the alignment path for the longitude based on the candidate alignment path identified at 950. For example, updating the alignment path may include omitting the alignment path indicated in the camera alignment model identified at 910 from the calibrated camera alignment model and including the candidate alignment path identified at 950 in the calibrated camera alignment model as the alignment path for the longitude. In another example, updating the alignment path may include using a weighted average of the alignment path indicated in the camera alignment model identified at 910 and the candidate alignment path identified at 950 as the alignment path for the longitude.

In some implementations, the relative weight of the candidate alignment path for updating the alignment path may be lowered, or updating based on the candidate alignment path may be omitted. For example, a difference between the alignment path for the longitude indicated by the camera alignment model identified at 910 and the candidate alignment path identified at 950 may exceed a threshold, which may indicate that the difference is inconsistent with one or more defined alignment change profiles, and updating based on the candidate alignment path may be omitted. An alignment change profile may indicate a defined range of change in alignment corresponding to a cause, such as a temperature change, of the change in alignment.

Although not shown separately in FIG. 9, in some implementations, determining the correspondence metrics at 940 may include determining a gradient of the match quality metric as a function of the angle of the path relative to the longitude, and calibrating the camera alignment model at 960 may be based on the gradient, and the periodic 2D search may be omitted. For example, a gradient of the match quality metric as a function of the angle of the path relative to the longitude may be a difference between the match metrics on adjacent pixels, such as two adjacent pixels, in a direction parallel to the equator, which may indicate a direction, magnitude, or both of angular offset to apply to a corresponding alignment path.

Figure 10A:
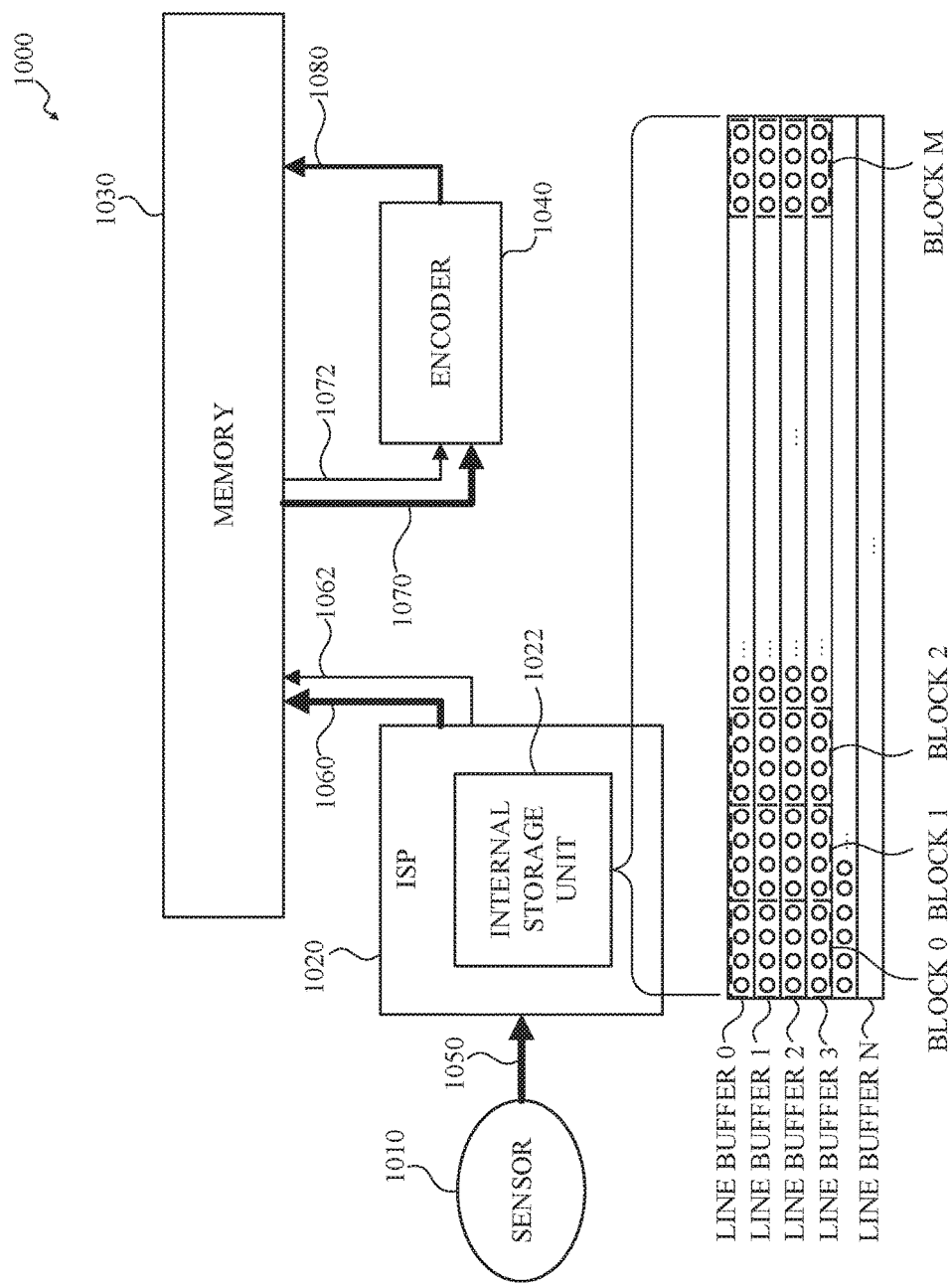
FIG. 10A is a block diagram of an example of an image signal processing and encoding pipeline in accordance with implementations of this disclosure.

FIG. 10A is a block diagram of an example of an image signal processing and encoding pipeline 1000 in accordance with implementations of this disclosure. In some implementations, the image signal processing and encoding pipeline 1000 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3. In some implementations, the image signal processing and encoding pipeline 1000 shown in FIG. 10A may be similar to the image processing and coding pipeline 400 shown in FIG. 4, except as described herein.

In some implementations, the image signal processing and encoding pipeline 1000 may include an image sensor 1010, such as the image sensor 230 shown in FIG. 2; an image signal processor (ISP) 1020, such as the image signal processor 410 shown in FIG. 4 or the image signal processor 500 shown in FIG. 5; a memory 1030, such as the electronic storage unit 224 shown in FIG. 2; an encoder 1040, such as the encoder 420 shown in FIG. 4; or a combination thereof. In some implementations, one or more of the image sensor 1010, the image signal processor 1020, the memory 1030, or the encoder 1040 may be implemented in any combination of one or more physical units.

In some implementations, the image sensor 1010 may be a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors. The image sensor 1010 may capture or measure values, such as pixel or sub-pixel values, representing an image, or a portion thereof, and may send, or transmit, the captured image, or image portion, to the image signal processor 1020 as an input image signal 1050. For example, the image sensor 1010 may generate and send the input image signal 1050 as an ordered, such as raster order, sequence of pixel values. In some implementations, the input image signal 1050 may represent each pixel value in a defined format, such as in an image sensor format, such as a RAW image signal format. In some implementations, the input image signal 1050 may include an image, or frame, or a portion thereof, which may be one of a sequence or series of images of a video. For example, the image sensor 1010 may send the input image signal 1050 to the image signal processor 1020 on a pixel-by-pixel or a line-by-line basis.

In some implementations, the image signal processor 1020 may include an internal storage unit 1022, such as the electronic storage 414 shown in FIG. 4. In some implementations, the internal storage unit 1022 may include one or more line buffers or busses for storing a defined number or cardinality of lines, such as four lines, five lines (as shown), or any other number of lines, of the input image signal 1050, which may be vertically-sequential (raster order) frame-width lines. Other internal storage structures may be implemented in the image signal processor 1020 instead of, or in addition to, the internal storage unit 1022 shown.

An expanded partial view of the internal storage unit 1022 is shown below the image signal processor 1020 for clarity. In the expanded partial view, the internal storage unit 1022 is shown as including N line buffers, individual pixels are represented as circles, and M 4×4 blocks are indicated by broken lines. Although 4×4 blocks are described herein, any other size block may be implemented.

In some implementations, the image signal processor 1020 may receive the input image signal 1050 from the image sensor 1010, such as on a pixel-by-pixel or line-by-line basis, and may store or cache one or more lines, or pixels, of the input image signal 1050 in the internal storage unit 1022. In some implementations, lines of the input image signal 1050 may be buffered in the internal storage unit 1022 on a rolling basis. For example, the internal storage unit 1022 may include five line buffers, a first line of the input image signal 1050 may be received by the image signal processor 1020 and buffered in the first line buffer, a second line of the input image signal 1050 may be received by the image signal processor 1020 and buffered in the second line buffer, a third line of the input image signal 1050 may be received by the image signal processor 1020 and buffered in the third line buffer, a fourth line of the input image signal 1050 may be received by the image signal processor 1020 and buffered in the fourth line buffer, a fifth line of the input image signal 1050 may be received by the image signal processor 1020 and buffered in the fifth line buffer, a sixth line of the input image signal 1050 may be received by the image signal processor 1020, the first line of the input image signal 1050 may be replaced in the first line buffer by the second line of the input image signal 1050, the second line of the input image signal 1050 may be replaced in the second line buffer by the third line of the input image signal 1050, the third line of the input image signal 1050 may be replaced in the third line buffer by the fourth line of the input image signal 1050, the fourth line of the input image signal 1050 may be replaced in the fourth line buffer by the fifth line of the input image signal 1050, and the fifth line of the input image signal 1050 may be replaced in the fifth line buffer by the sixth line of the input image signal 1050.

In some implementations, the image signal processor 1020 may process one or more portions of the input image signal 1050. For example, the image signal processor 1020 may process one or more pixels, one or more lines, or one or more blocks of the input image signal 1050 buffered in the internal storage unit 1022. For example, the internal storage unit 1022 may include four or more line buffers and one or more 4×4 blocks of the input image signal 1050 may be identified based on four buffered lines of the input image signal 1050 buffered in the four line buffers of the internal storage unit 1022.

In some implementations, processing the input image signal 1050 by the image signal processor 1020 may include determining one or more image indications based on the input image signal 1050, such as based on one or more pixels, blocks, or lines, of the input image signal 1050 buffered in the internal storage unit 1022. For example, the image signal processor 1020 may process the input image signal 1050 as described herein, such as shown in FIG. 4 and FIG. 5, which may include generating one or more image indications. In some implementations, one or more of the image indications may be associated with one or more pixels, or sub-pixels, one or more blocks, one or more lines, one or more frames, or with any other portion of an image or video signal. An example of determining image indications is shown in FIG. 11.

In some implementations, the image signal processor 1020 may generate processed image data. The processed image data may include processed pixel data, such as pixel data in a defined processed format, such as YUV, which may be referred to herein as the processed image signal. In some implementations, the image signal processor 1020 may buffer the processed image data, or a portion thereof, in the internal storage unit 1022, in another internal data storage structure, or in a combination of the internal storage unit 1022 and another internal data storage structure.

In some implementations, the image signal processor 1020 may output the processed image data, or a portion thereof, as processed image data 1060. For example, the image signal processor 1020 may store the processed image data 1060, or a portion thereof, in the memory 1030. In some implementations, the image signal processor 1020 may store the processed image data 1060 in the memory 1030 on a pixel-by-pixel basis, a block-by-block basis, a line-by-line basis, a frame-by-frame basis, or on the basis of any other image signal portion, which may include storing the processed image data 1060, corresponding image indications 1062, or both in the memory 1030, such as on a rolling basis.

In some implementations, the image signal processor 1020 may output the image indications, or a portion thereof, as processed image indications 1062. For example, the image signal processor 1020 may store the image indications, or a portion thereof, in the memory 1030 as processed image indications 1062, which may include storing the processed image indications 1062 on a rolling basis. In some implementations, the processed image indications 1062 may include image indications received from a sensor, such as the image sensor 1010, image indications determined by the image signal processor 1020, or a combination thereof.

For example, the image signal processor 1020 may receive four lines of the input image signal 1050 from the sensor 1010. The image signal processor 1020 may buffer the four lines in the internal storage unit 1022. The image signal processor 1020 may generate four lines of processed image data 1060 based on the four lines buffered in the internal storage unit 1022. The image signal processor 1020 may generate one or more image indications based on the four lines buffered in the internal storage unit 1022, based on the four lines of processed image data 1060, or based on both the input image data 1050 and the processed image data 1060. The image signal processor 1020 may output the four lines of processed image data 1060, the processed image indications 1062, or both by storing the output information in the memory 1030. The image signal processor 1020 may receive one or more other lines of the input image signal 1050 from the sensor 1010, and may replace one or more of the lines buffered in the internal storage unit 1022 with one or more of the other lines of the input image signal 1050.

In some implementations, the image signal processor 1020 may output the processed image data 1060 separately, such as independently, from the processed image indications 1062 or may store the processed image indications 1062 in conjunction with storing the processed image data 1060. Although not shown separately in FIG. 10A, in some implementations, the image signal processor 1020 may output the processed image data 1060, the processed image indications 1062, or both to the encoder 1040. In some implementations, the image signal processor 1020 may omit storing the processed image data 1060, the processed image indications 1062, or both in the memory 1030.

In some implementations, the ISP 1020 may determine an average value of image indications (e.g., scene complexity metrics) for blocks across a complete frame or GOP. For example, a running total of the scene complexity metric values for blocks within a frame may be processed as those values are determined. The final total for the frame (possibly scaled, e.g., divided by the number of blocks in the frame) may be written to memory 1030 as part of the processed image indications 1062. For example, the average value of the scene complexity metrics for blocks in a frame may be utilized to facilitate comparison of the different blocks within the frame (e.g., by determining a ratio of the individual scene complexity metric values to the average value for the frame) and/or to facilitate quantization of the scene complexity metrics (e.g., using a buckets approach with thresholds based on the average value for the frame).

In some implementations, the encoder 1040 may receive source image data 1070, source image indications 1072, or both. For example, the encoder 1040 may read the source image data 1070 from the memory 1030, may read the source image indications 1072 from the memory 1030, or may read both the source image data 1070 and the source image indications 1072 from the memory 1030. Although described herein as source image data 1070, the source image data 1070 may include the processed image data 1060 stored by the image signal processor 1020 for one or more frames, such as frames of a video sequence. Although described herein as source image indications 1072, the source image indications 1072 may include the image indications 1062 stored by the image signal processor 1020 for one or more frames, such as frames of a video sequence, corresponding to the source image data 1070.

Although not shown in FIG. 10A, in some implementations, the image signal processor 1020 may omit storing the processed image data 1060, the image indications 1062, or both in the memory 1030. In some implementations, the encoder 1040 may receive the source image data 1070, the source image indications 1072, or both from the image signal processor 1020.

In some implementations, the encoder 1040 may read one or more source frames of video data, which may include buffering the source frames, such as in an internal data storage unit of the encoder 1040. For example, the image signal processor 1020 may store portions, such as lines or groups of lines, of a frame in the memory 1030 on a rolling basis, and the encoder 1040 may read the source image data 1070, the source image indications 1072, or both corresponding to the stored processed image data 1060 and the stored processed image indications 1062 for the frame on a periodic basis or in response to the image signal processor 1020 storing data in the memory 1030.

In some implementations, the encoder 1040 may compress the source image data 1070, the source image indications 1072, or both. Compressing the source image data 1070, the source image indications 1072, or both may include reducing redundancy in the image data. For example, reducing redundancy may include reducing spatial redundancy based on a frame, reducing temporal redundancy based on the frame and one or more previously encoded frames, or reducing both spatial and temporal redundancy.

In some implementations, the encoder 1040 may encode each frame of a video sequence on a block-by-block basis. For example, the encoder 1040 may encode a current block of a current frame from the source video data 1070, which may include generating a predicted, or prediction, block based on previously coded information, such as one or more previously coded and reconstructed blocks or frames. Generating a prediction block may include performing motion compensation, which may include performing motion estimation, which may include identifying a portion, or portions, of one or more previously encoded and reconstructed frames, which may be referred to herein as reference frames, that closely matches the current block. A displacement between a spatial location of the current block in the current frame and a matching portion of the reference frame may be indicated by a motion, or displacement, vector. A difference between the prediction block and the current block may be identified as a residual or a residual block. The residual block may be transformed using a transform, such as a discrete cosign transform (DCT), an asymmetric discrete sine transform (ADST), or any other transform or combination of transforms, to generate a transform block including transform coefficients, which may be represented as a matrix, which may have the size and shape of the residual block. The encoder 1040 may perform quantization to quantize the transform coefficients, which may reduce the accuracy of the encoded data, the bandwidth utilization for the encoded data, or both. The quantized transform coefficients, the motion vectors, other encoding data, or a combination thereof may be entropy coded to generate entropy coded data, which may be referred to herein as the encoded data or the encoded output, and the encoded data may be output by the encoder 1040 as encoded output 1080. Although block-based encoding is described herein, other image coding techniques, such as coding based on arbitrary size and shape units, may be implemented in accordance with this disclosure.

In some implementations, the encoder 1040 may output, such as store, transmit, or both, the encoded data as encoded output 1080. For example, the encoder 1040 may store the encoded data as encoded output 1080 in the memory 1030, may transmit the encoded output 1080 to another device (not shown), or may store the encoded data as encoded output 1080 in the memory 1030 and transmit the encoded output 1080 to another device (not shown).

In some implementations, the encoded output 1080 may be received by a decoder (not shown), and may be decompressed, or decoded, to generate a reconstructed image or video corresponding to the source image data 1070.

In some implementations, one or more elements of encoding the source image data 1070, such as entropy coding, may be lossless. A reconstructed image or video generated based on losslessly encoded image or video data may be identical, or effectively indistinguishable, from the source image data 1070.

In some implementations, one or more elements of encoding the source image data 1070, such as quantization, may be lossy, such that some information, or the accuracy of some information, compressed by lossy compression may be lost or discarded or may be otherwise unavailable for decoding the encoded data. The accuracy with which a reconstructed image or video generated based on encoded image data encoded using lossy compression matches the source image data 1070 may vary based on the amount of data lost, such as based on the amount of compression. In some implementations, the encoder 1040 may encode the processed image data 1070 using a combination of lossy and lossless compression.

In some implementations, encoding, such as block-based encoding, may include the encoder 1040 adjusting encoding parameters to balance resource utilization and quality, or accuracy, of corresponding reconstructed images or video. For example, the encoder 1040 may allocate bits for encoding a block, may adjust a quantization parameter to increase or reduce the accuracy, or quality, of the corresponding reconstructed frame or video and increase or reduce the cardinality of bits utilized for encoding the block, or may allocate bits and adjust quantization or other encoding parameters.

In an example, a block of a frame of the source image data 1070 may include content that is flat, monotone, or includes little or no motion, and the encoder 1040 may over-allocate bits to the block, which may be an inefficient allocation of resources. In another example, a block of a frame of the source image data 1070 may include complex content or significant motion, and the encoder 1040 may under-allocate bits to the block, which may reduce accuracy or quality of a corresponding reconstructed frame or video.

In some implementations, the encoder 1040 may implement constant bitrate (CBR) coding, which may include allocating a defined cardinality of bits for encoding each fame, or each block of a frame, prior to encoding the frame, or a portion of the frame, such as a tile, a segment, or any other portion or combination of portions of one or more frames of a video sequence, and may include adjusting encoding quality or accuracy, such as by adjusting a quantization parameter, to comply with the bit allocations.

In some implementations, the encoder 1040 may implement single-pass variable bitrate (VBR) coding, which may include allocating a respective cardinality of bits for a unit, such as for a frame or a block, independent, or partially independent, of the content captured by the image, which may inefficiently over or under allocate resources for some blocks. In some implementations, the encoder 1040 may implement multi-pass variable bitrate encoding, such as two-pass variable bitrate encoding, which may include analyzing the frame in a first pass (look-ahead) and optimizing the resource allocation for encoding the frame in a second pass based on the first pass analysis, which may improve bit allocation and accuracy and may increase processing and power utilization, latency, or both.

In some implementations, the image signal processor 1020 may generate one or more encoding hints and may include the encoding hints in the image indications 1062, which may be stored in the memory 1030, or otherwise provided to the encoder 1040. The encoder 1040 may receive the encoding hints, such as by reading the source image indications 1072, and may utilize the encoding hints to encode the image or video, or one or more portions thereof. For example, the image signal processor 1020 may determine one or more scene complexity metrics for a video, a frame, or a portion of a frame, such as one or more blocks, and may include the scene complexity metrics in the image indications 1062 stored in the memory 1030 as encoding hints, which may be encoding hints for bitrate control or optimization, and the encoder 1040 may encode the corresponding video, frame, blocks, or block by performing single-pass variable bitrate coding or constant bitrate coding, which may include reading the corresponding source image indications 1072, identifying the scene complexity metrics from source image indications 1072, and adjusting encoding parameters, such as bit allocation, quantization levels, or both, based on the scene complexity metrics, which may improve resource utilization, accuracy, or both relative to single-pass encoding without encoding hints and may reduce latency, resource utilization, or both relative to multi-pass (look-ahead) encoding.

Figure 10B:
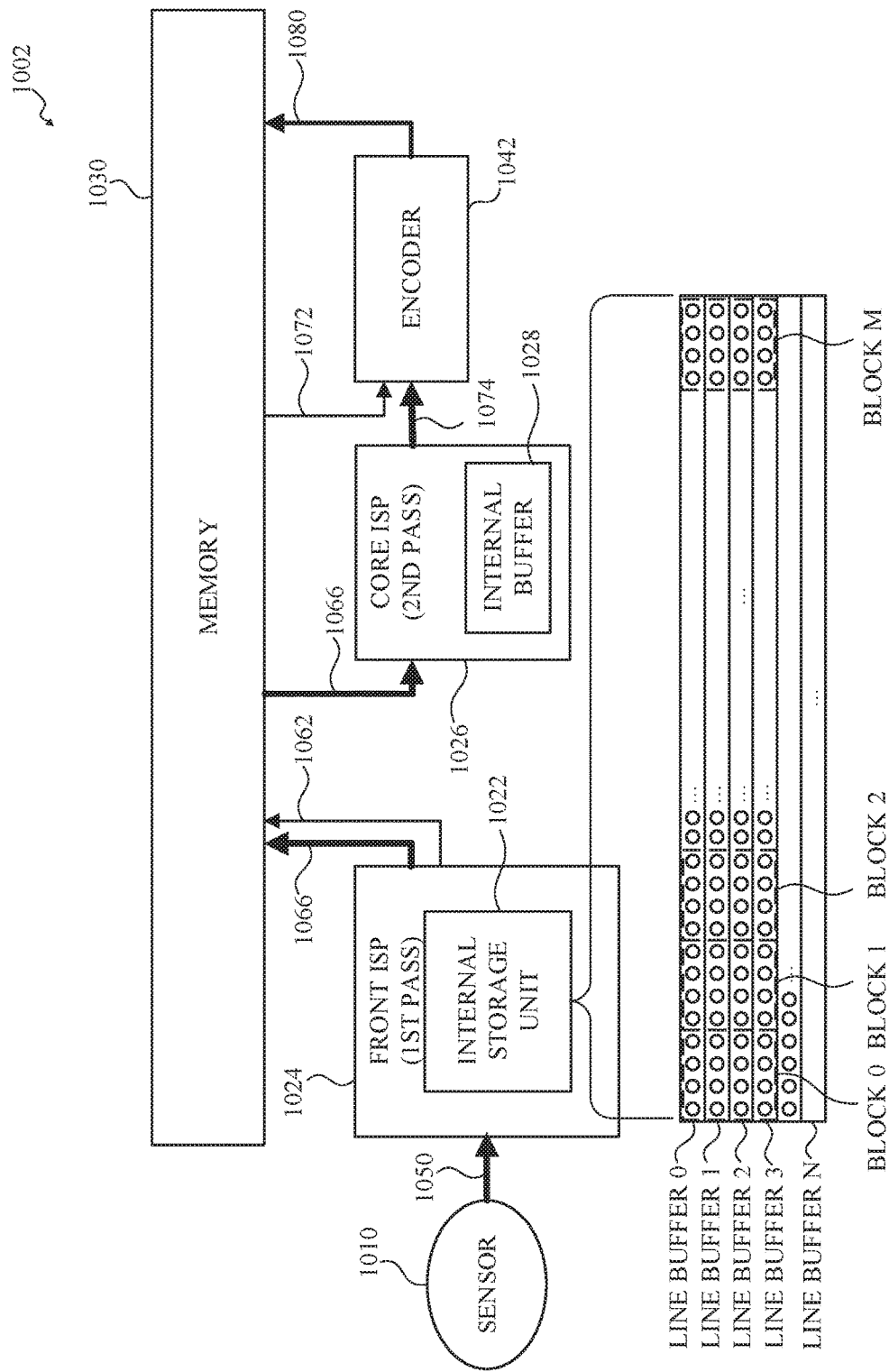
FIG. 10B is a block diagram of an example of an image signal processing and encoding pipeline in accordance with implementations of this disclosure.

FIG. 10B is a block diagram of an example of an image signal processing and encoding pipeline 1002 in accordance with implementations of this disclosure. In this example, an image signal processor implements a multi-pass processing in two stages, a front ISP 1024 and a core ISP 1026. Processed image data 1074 is passed directly from the core ISP 1026 to the encoder 1042 as it is generated (e.g., in raster order), avoiding an intermediate write to and read from the memory 1030. This example configuration of the pipeline 1002 may conserve processing resources, including memory bandwidth and processor time, and/or reduce latency. In some implementations, the image signal processing and encoding pipeline 1002 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3. In some implementations, the image signal processing and encoding pipeline 1002 shown in FIG. 10B may be similar to the image processing and coding pipeline 400 shown in FIG. 4, except as described herein.

The image signal processing and encoding pipeline 1002 includes an image sensor 1010, as described in relation to FIG. 10A. The input image signal 1050 from the sensor 1010 is passed to the front ISP 1024 for initial processing. For example, the front ISP 1024 may be similar to the front ISP 510 of FIG. 5 and implement some or all of that component's functions. The front ISP 1024 may process the input image data 1050 to generate partially processed image data 1066 that may be subject to one or more additional passes of processing in the core ISP 1026 before being input to the encoder 1042. One or more frames of partially processed image data 1066 may be concurrently stored in the memory 1030 to await additional processing by the core ISP 1026.

The front ISP 1024 includes internal storage unit 1022 and utilizes the internal storage unit 1022 to determine the image indications 1062 based on the input image data 1050, as described in relation to the ISP 1020 of FIG. 10A. The image indications 1062 (e.g., scene complexity metrics for blocks of pixels) are stored in the memory 1030. The stored image indications 1062 may be associated with corresponding portions (e.g., frames and/or blocks of pixels) of the partially processed image data 1066. In some implementations, the front ISP 1024 may determine an average value of image indications (e.g., scene complexity metrics) for blocks across a complete frame or GOP. For example, a running total of the scene complexity metric values for blocks within a frame may be processed as those values are determined. The final total for the frame (possibly scaled, e.g., divided by the number of blocks in the frame) may be written to memory 1030 as part of the image indications 1062. For example, the average value of the scene complexity metrics for blocks in a frame may be utilized to facilitate comparison of the different blocks within the frame (e.g., by determining a ratio of the individual scene complexity metric values to the average value for the frame) and/or to facilitate quantization of the scene complexity metrics (e.g., using a buckets approach with thresholds based on the average value for the frame).

The core ISP 1026 reads the partially processed image data from the memory 1030 and performs a second pass of processing to generate processed image data 1074. For example, the core ISP 1026 may perform additional functions (e.g., temporal noise reduction) of the image signal processor 500 discussed in relation to FIG. 5 to generate the processed image data 1074. The core ISP 1026 may include an internal buffer 1028 (e.g., similar to internal storage unit 1022) that stores less than a complete frame of the image data. In some implementations, the internal buffer 1028 for the core ISP 1026 is the internal storage unit 1022 used by the front ISP 1024, where, for example, the front ISP 1024 and the core ISP 1026 share hardware resources as they successively process frames of the input image data 1050. The processed image data 1074 may be passed directly to the encoder 1042 without being written to the memory 1030. For example, one or more blocks of pixels of the processed image data 1074, as they are completed, may be copied from the internal buffer 1028 to internal storage within the encoder 1042. For example, pixels of the processed image data 1074 may be copied from the internal buffer 1028 to the encoder 1042 in raster order as those pixels become available. By avoiding an intermediate write to and read from the memory 1030 for the processed image data 1074 as it passes from the core ISP 1026 to the encoder 1042, computing resources (e.g., memory and processor bandwidth) may be conserved.

The encoder 1042 reads source image indications 1072 from the memory 1030. Although described herein as source image indications 1072, the source image indications 1072 may include the image indications 1062 stored by the front ISP 1024 for one or more frames, such as frames of a video sequence, corresponding to the processed image data 1074. The encoder 1042 may then receive corresponding the processed image data 1074 that has been processed by the core ISP 1026 directly from the internal buffer 1028 for encoding using the source image indications 1072. The encoder 1042 may generate the encoded output 1080 based on the processed image data 1074 and the source image indications 1072 using encoding techniques described in relation to the encoder 1040 of FIG. 10A. For example, the source image indications 1072 may include scene complexity metrics for blocks within a frame of video data being encoded that were stored in the memory 130 by the front ISP 1024 as encoding hints. The encoder 1042 may use the scene complexity metrics to determine encoding parameters (e.g., bit allocation, quantization levels, or both) for blocks within the frame of video data. Since the encoding parameters for the whole frame are available at the start of processing in the core ISP 1026, blocks of pixels from the processed image data 1074 may be encoded using the determined encoding parameters as those blocks are received from the core ISP 1026. This configuration may enable the encoder 1042 to efficiently encode video data in a single-pass without requiring intermediate access to the memory 1030 between the core ISP 1026 and the encoder 1042.

In some implementations, the scene complexity metrics included in the source image indications 1072 for a plurality of frames are stored in the memory 1030 concurrently. For example, the encoder 1042 may utilize the scene complexity metrics for blocks across the frames corresponding to a GOP (group of pictures) for encoding to allocate bits for encoding to the GOP and/or among frames and/or blocks of the GOP.

Figure 10C:
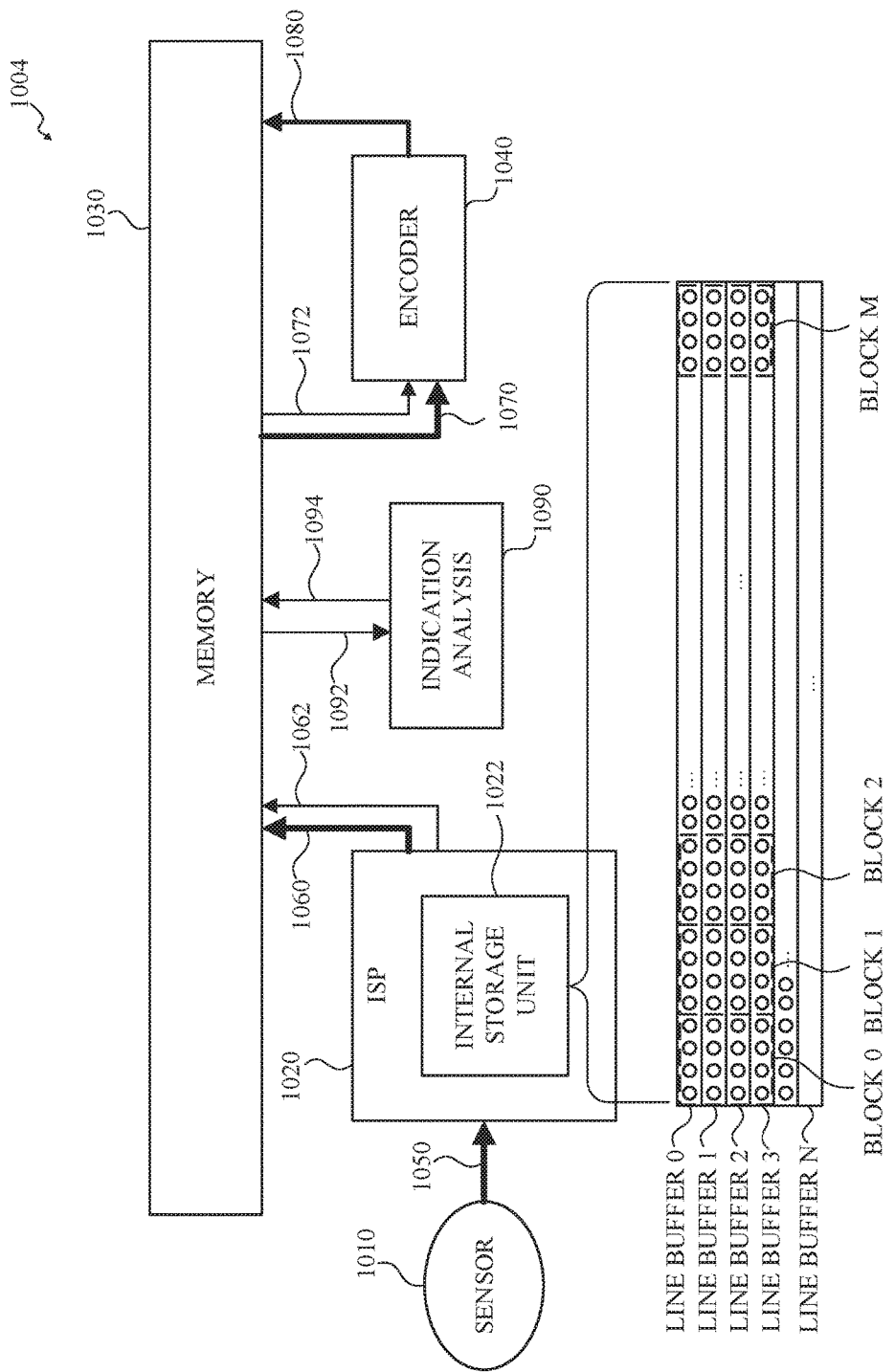
FIG. 10C is a block diagram of an example of an image signal processing and encoding pipeline in accordance with implementations of this disclosure.

FIG. 10C is a block diagram of an example of an image signal processing and encoding pipeline 1004 in accordance with implementations of this disclosure. Encoding pipeline 1004 is similar to encoding pipeline 1000 of FIG. 10A and has many of the same components. However, in this example, an indication analysis module 1090 performs intermediate processing on image indications 1092 (which may include some or all of the image indications 1062) that have been determined by the ISP 1020 and stored in the memory 1030. This intermediate processing is performed before the encoder 1040 reads the source image indications 1072 from the memory 1030 and the results 1094 of the intermediate processing may be included in the source image indications 1072 when they are read by the encoder 1040.

The indication analysis module 1090 may analyze image indications for blocks across a macro-block, a frame, a GOP, or another unit of video encoding. For example, the indication analysis module 1090 may determine an average value of image indications 1092 (e.g., scene complexity metrics) for blocks across a complete frame or GOP. For example, the average value of image indications 1092 for blocks across a complete frame may be output as part of the results 1094 that are written to the memory 1030. In some implementations, the indication analysis module 1090 may utilize the average value of scene complexity metrics for blocks in a frame to facilitate comparison of the different blocks within the frame and/or to facilitate quantization of the scene complexity metrics. For example, the indication analysis module 1090 may determine relative complexity indications (e.g., a ratio of individual scene complexity metric values for blocks to the average value for the frame) based on the average value and the individual image indications for blocks and output these relative complexity indications as part of the results 1094.

For example, the analysis module 1090 may determine encoding hints based on the image indications 1092. The encoding hints may be output as part of the results 1094 and read by the encoder 1040 as part of the source image indications 1072. For example, the analysis module 1090 may determine a quantization parameter for a whole image or frame as an encoding hint based on image indications for blocks in the image or frame. For example, the analysis module 1090 may determine a quantization parameter for a block of pixels (e.g., a macro-block) as an encoding hint based on image indication(s) for the block as compared to other blocks within a frame or GOP. For example, the analysis module 1090 may determine a quantization parameter per frame or averaged (e.g., using a running mean) over several frames (e.g., 2 to 100 frames) as an encoding hint to reduce sudden quality changes. For example, encoding hints may characterize the difficulty of encoding an image (e.g., a frame of video). For example, difficulty of encoding may depend on motion (e.g., more motion more difficult), texture, or contrast.

For example, the analysis module 1090 may be implemented as software running on an application processor with access to the memory 1030. The indication analysis module 1090 may be easier or cheaper to update or modify than some implementations of the ISP 1020 or some implementations of the encoder 1040 (e.g., an encoder that is implemented in hardware and/or provided as object code). The indication analysis module 1090, may carry out intermediate analysis to format image indications from an ISP in a format that an encoder is designed to receive. Using an indication analysis module 1090 may reduce the cost and delays associated with maintaining the encoding pipeline 1004 as different components in the pipeline 1004 are updated.

In some implementations (not shown), an indication analysis module (similar to the indication analysis module 1090) may be utilized with a two stage ISP (similar to the two stage ISP of FIG. 10B) to combine the benefits of pipeline 1002 and pipeline 1004. For example, the indication analysis module may read image indications for a complete image or frame as or after the first stage (e.g., similar to the front ISP 1024) of the ISP outputs those image indications. The indication analysis module may then perform its intermediate processing and output results to be included in source image indications to a memory (e.g., the memory 1030) before the second pass processing begins in the second stage (e.g., similar to the core ISP 1026) and processed image data is passed directly to the encoder for encoding based in part on the image indications for the entire image or frame.

FIG. 11 shows examples of blocks for determining scene complexity in accordance with this disclosure. In some implementations, an image signal processor, such as the image signal processor 1020 shown in FIG. 10A, may generate one or more encoding hints, such as scene complexity encoding hints, and may include the encoding hints in image indications, such as the image indications 1062 shown in FIG. 10A, stored in a shared memory, such as the memory 1030 shown in FIG. 10A, or otherwise provided to an encoder, such as the encoder 1040 shown in FIG. 10A.

In some implementations, the image signal processor may generate one or more image indications for a portion of a frame, such as a block, as encoding hints. For example, the image signal processor may include an internal storage unit, such as the internal storage unit 1022 shown in FIG. 10A, which may buffer images data, such as four lines of a frame; the image signal processor may identify a block, such as a 4×4 block, such as Block 0 shown in FIG. 10, as a current block; the image signal processor may generate one or more image indications for the block; and the image signal processor may store the image indication(s) in a shared memory, such as the memory 1030 shown in FIG. 10A, as encoding hints.

In some implementations, one or more previously processed portions, such as previously processed lines, of an image or video may be omitted from the internal storage unit of the image signal processor, or may be otherwise unavailable to the image signal processor, for generating the image indications, and the image signal process may read the unavailable portion (lines) from the shared memory, which may include buffering the lines in the internal storage unit.

In some implementations, determining an image indication (e.g., a scene complexity metric) for a block may include determining an activity variance metric, such as a vertical activity variance metric, a horizontal activity variance metric, or a combination thereof, for the block.

In FIG. 11, the top block 1100 shows an example of determining a vertical activity variance metric, as indicated by the vertical dotted lines. For example, the top block 1100 may correspond with a block, such as Block 0 shown in FIG. 10A, buffered in an internal storage unit of the image signal processor. In some implementations, determining a vertical activity variance metric for a block may include determining a sum of absolute differences of pixel values vertically in the block. For simplicity and clarity, pixels in the blocks 1100, 1110 shown in FIG. 11 are indicated using Cartesian coordinates, $P_{m,n}$, wherein the value of "m" indicates a row in the block and the value of "n" indicates a column in the block.

In some implementations, determining a vertical activity variance metric may include determining a sum of absolute differences (SAD), or other variance metric, for a first column of the block (V1), which may be expressed as $SAD_{V1}=|P_{0,0}-P_{1,0}|+|P_{1,0}-P_{2,0}|+|P_{2,0}-P_{3,0}|$, determining a sum of absolute differences, or other variance metric, for a second column of the block (V2), which may be expressed as $SAD_{V2}=|P_{0,1}-P_{1,1}|+|P_{1,1}-P_{2,1}|+|P_{2,1}-P_{3,1}|$, determining a sum of absolute differences, or other variance metric, for a third column of the block (V3), which may be expressed as $SAD_{V3}=|P_{0,2}-P_{1,2}|+|P_{1,2}-P_{2,2}|+|P_{2,2}-P_{3,2}|$, determining a sum of absolute differences, or other variance metric, for a fourth column of the block (V4), which may be expressed as $SAD_{V4}=|P_{0,3}-P_{1,3}|+|P_{1,3}-P_{2,3}|+|P_{2,3}-P_{3,3}|$, and may include determining a sum of the sum of absolute differences for the first column of the block (V1), the sum of absolute differences for the second column of the block (V2), the sum of absolute differences for the third column of the block (V3), and the sum of absolute differences for the fourth column of the block (V4) as the vertical activity variance metric ($SAD_V$), which may be expressed as $SAD_V=SAD_{V1}+SAD_{V2}+SAD_{V3}+SAD_{V4}$.

In FIG. 11, the bottom block 1110 shows an example of determining a horizontal activity variance metric, as indicated by the horizontal dotted lines. For example, the bottom block 1110 may correspond with a block, such as Block 0 shown in FIG. 10A, buffered in an internal storage unit of the image signal processor. In some implementations, determining a horizontal activity variance metric for a block may include determining a sum of absolute differences of pixel values horizontally in the block.

In some implementations, determining a horizontal activity variance metric may include determining a sum of absolute differences (SAD), or other variance metric, for a first row of the block (H1), which may be expressed as $SAD_{H1}=|P_{0,0}-P_{0,1}|+|P_{0,1}-P_{,2}|+|P_{0,2}-P_{0,3}|$, determining a sum of absolute differences, or other variance metric, for a second row of the block (H2), which may be expressed as $SAD_{H2}=|P_{1,0}-P_{1,1}|+|P_{1,1}-P_{1,2}|+|P_{1,2}-P_{1,3}|$, determining a sum of absolute differences, or other variance metric, for a third row of the block (H3), which may be expressed as $SAD_{H3}=|P_{2,0}-P_{2,1}|+|P_{2,1}-P_{2,2}|+|P_{2,2}-P_{2,3}|$, determining a sum of absolute differences, or other variance metric, for a fourth row of the block (H4), which may be expressed as $SAD_{H4}=|P_{3,0}-P_{3,1}|+|P_{3,1}-P_{3,2}|+|P_{3,2}-P_{3,3}|$, and may include determining a sum of the sum of absolute differences for the first row of the block (H1), the sum of absolute differences for the second row of the block (H2), the sum of absolute differences for the third row of the block (H3), and the sum of absolute differences for the fourth row of the block (H4) as the horizontal activity variance metric ($SAD_H$), which may be expressed as $SAD_H=SAD_{H1}+SAD_{H2}+SAD_{H3}+SAD_{H4}$.

In some implementations, determining the scene complexity metric for the block may include determining a combined, horizontal and vertical, activity variance metric, which may be expressed as shown in the following:

$$\text{Activity} = \Sigma(|P_{m,n}-P_{m+1,n}|) + \Sigma(|P_{m,n}-P_{m,n+1}|) \quad \text{[Equation 1]}$$

In some implementations, the image signal processor may store the horizontal, vertical, or combined activity variance metric for the block in the shared memory, which may include storing an association between the activity variance metric for the block and the processed image data for the block in the shared memory. Although directional sums of absolute differences are described as activity variance metrics for determining scene complexity herein, other metrics may be determined as encoding hints for bitrate optimization in accordance with implementations of this disclosure.

In some implementations, the scene complexity metrics may be determined based on differences between successive frames of video data. For example, the difference between corresponding blocks in two successive frames may be determined and activity variance metrics (e.g., vertical and/or horizontal sums of absolute differences) may be determined for that difference block using the techniques described above in relation to FIG. 11. Determining scene complexity metrics based on differences between successive frames may be more efficient in an image signal processor that implements temporal noise reduction, since the successive frame difference signals (with local motion compensation) will be determined for temporal noise reduction in any case. Thus, few additional image processing resources may be required to determining scene complexity metrics based on differences between successive frames in such an image signal processor. Determining scene complexity metrics based on differences between successive local motion compensated frames may provide better encoding hints because an encoder may operate by encoding differences between successive frames with motion compensation. For example, determining scene complexity metrics based on the input video may include determining a difference block between corresponding blocks in successive frames of the input video and determining one or more activity variance metrics for the difference block. For example, determining a difference block between corresponding blocks in successive frames of the input video may include applying local motion compensation to the corresponding blocks in successive frames of the input video and determining the difference block based on the local motion compensated blocks. For example, the one or more activity variance metrics may include a sum of absolute differences between pixels in the difference block.

In some implementations, an encoder, such as the encoder 1040 shown in FIG. 10A, may encode a group of pictures (GOP), a frame, or a portion thereof, such as a frame of a video sequence. The encoder may receive source image data, such as processed image data generated by the image signal processor, and corresponding source image indications, which may include the processed image indications, such as the activity variance metrics generated and stored by the image signal processor for the blocks of the frame as encoding hints. In some implementations, the encoder may read the source image data and the corresponding source image indications from an external memory, such as the memory 1030 shown in FIG. 10A, and the encoder may determine or adjust one or more encoding parameters, such as bit allocation or quantization parameters, for encoding one or more blocks of a frame based on the activity variance metrics.

Constant bit rate approaches have drawbacks. Having a fixed, equal bit distribution method will have non-uniform visual quality within the frame and across frames as the content varies. To maintain uniform quality within the picture and across the pictures within a GOP, bit allocation may be dynamically adjusted based on content (e.g., based on block level scene complexity metrics passed in to the encoder as encoder hints).

Local scene complexity metrics for blocks within a frame may be analyzed before starting the encode to in order to allocate bits among blocks. Local scene complexity metrics can be analyzed to generate intermediate image indications in order to reduce the activity controls needed for encoding. Analysis may include, for example, quantizing the scene complexity metrics using a bucket approach with a few complexity levels. For example, the thresholds between quantization levels for the metric may be determined based on statistics (e.g., a mean or median value) of the distribution of metric values for blocks within the current frame or GOP being encoded. By adjusting the encode parameters to effect this dynamic bit allocation, a more uniform visual quality across the frame may be maintained. A similar approach may be applied to a GOP where local scene complexity metrics may be collected and analyzed for multiple frames before staring the encode of the GOP.

For example, an average value of image indications 1062 (e.g., scene complexity metrics) for blocks across a complete frame or GOP may be computed by the encoder (1040 or 1042) based on the source image indications 1072 or read by the encoder (1040 or 1042) from the memory 1030 as part of the source image indications 1072. For example, the average value of the scene complexity metrics for blocks in a frame may be utilized to facilitate comparison of the different blocks within the frame (e.g., by determining a ratio of the individual scene complexity metric values to the average value for the frame) and/or to facilitate quantization of the scene complexity metrics (e.g., using a buckets approach with thresholds based on the average value for the frame).

In an example, the activity variance metric for a block may indicate a relatively high value, such as a value exceeding a complexity threshold (e.g., the average value of the metric across blocks within a current frame or GOP), and the encoder may allocate a relatively high bit allocation, a relatively high quantization parameter, or both for the block. In another example, the activity variance metric for a block may indicate a relatively low value, such as a value within a defined activity threshold, and the encoder may allocate a relatively low bit allocation, a relatively low quantization parameter, or both for the block.

Figure 12A:
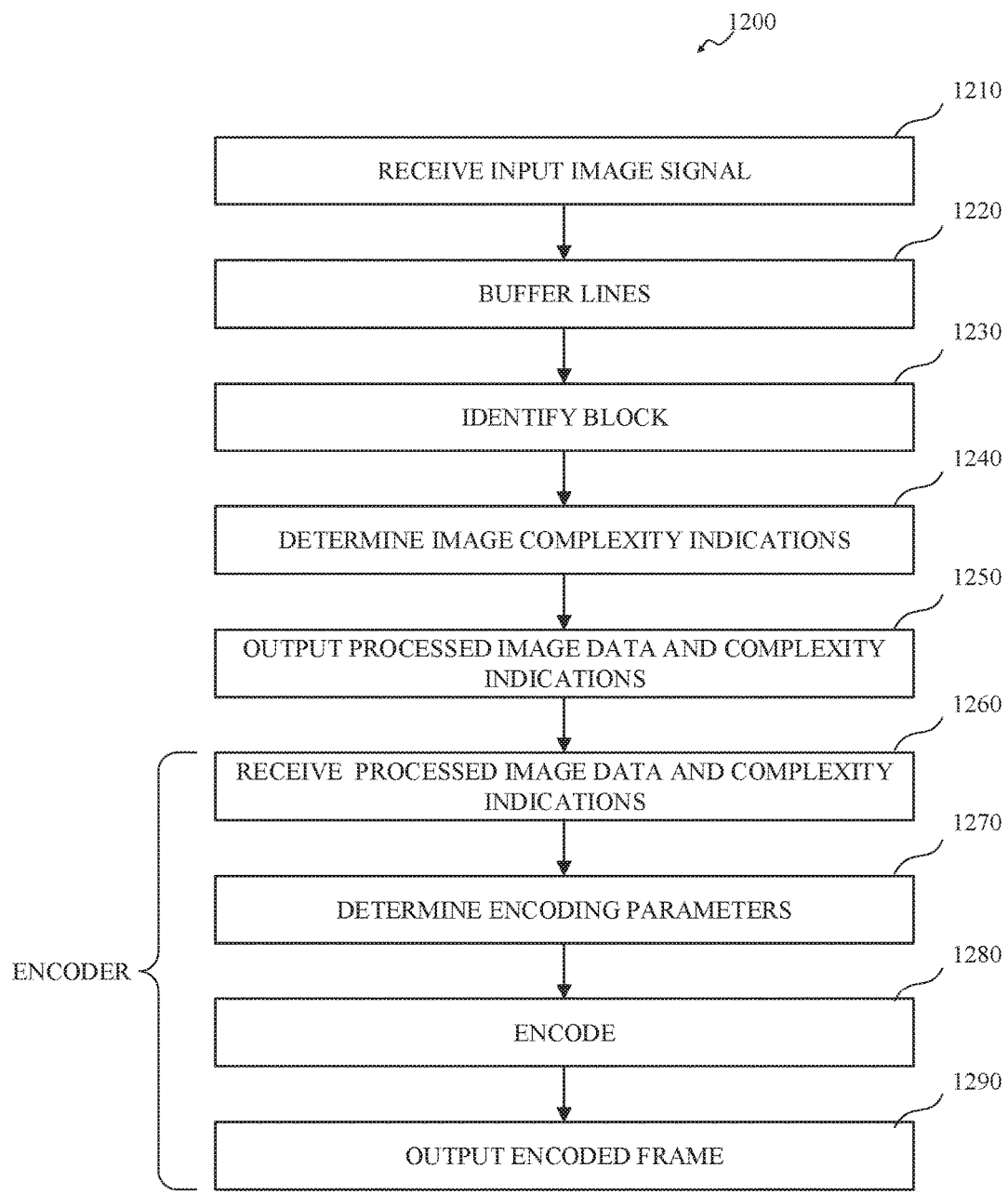
FIG. 12A shows an example of image signal processing and encoding with image signal processing based encoding hints for bitrate control in accordance with this disclosure.

FIG. 12A shows an example of image signal processing and encoding with image signal processing-based encoding hints for bitrate control 1200 in accordance with this disclosure. In some implementations, image signal processing and encoding with image signal processing-based encoding hints for bitrate control 1200 may be implemented in an image capture apparatus, such as the image capture apparatus 110 shown in FIG. 1 or the dual lens image capture apparatus 300 shown in FIG. 3, or an image capture device, such as one of the image capture devices 130, 132, 134 shown in FIG. 1 or the image capture device 200 shown in FIG. 2. For example, an image capture device may include an image signal processor, such as the image signal processor 410 shown in FIG. 4, the image signal processor 500 shown in FIG. 5, or the image signal processor 1020 shown in FIG. 10A, and an encoder, such as the encoder 420 shown in FIG. 4 or the encoder 1040 shown in FIG. 10A, and the image capture device may implement image signal processing and encoding with image signal processing-based encoding hints for bitrate control 1200.

In some implementations, image signal processing and encoding with image signal processing-based encoding hints for bitrate control 1200 may include receiving an input image signal at 1210, buffering one or more lines of the input image signal at 1220, identifying a block at 1230, determining an image indication at 1240, outputting processed image data and image indications at 1250, receiving the processed image data and image indications at 1260, determining encoding parameters at 1270, generating an encoded frame at 1280, outputting the encoded frame at 1290, or a combination thereof.

In some implementations, the image signal processor may receive an input image signal at 1210. For example, the image signal processor may receive the input image signal as shown at 1050 in FIG. 10A from an image sensor, such as the image sensor 1010 shown in FIG. 10A. For example, the image sensor may generate an image signal as an ordered, such as raster order, sequence of pixel, or sub-pixel, values, and may send the image signal to the image signal processor as the input image signal. In some implementations, the input image signal may represent each pixel value in a defined format, such as in a RAW image signal format. In some implementations, the input image signal may include an image, or frame, or a portion thereof, which may be one of a sequence of images of a video. For example, the image sensor may send the input image signal to the image signal processor on a pixel-by-pixel or line-by-line basis.

In some implementations, the image signal processor may buffer one or more lines of the input image signal at 1220. For example, the image signal processor may include an internal storage unit, such as the internal storage unit 1022 shown in FIG. 10A, and the image signal processor may buffer the one or more lines of the input image signal in the internal storage unit. In some implementations, lines of the input image signal may be buffered in the internal storage unit on a rolling basis.

In some implementations, the image signal processor may identify a block at 1230. For example, the internal storage unit may include N, or more, line buffers, such as 4 or more line buffers, the image signal processor may buffer N lines of the input image signal in the N line buffers at 1220, and the image signal processor may identify a N×N, such as 4×4, block from the N line buffers at 1230.

In some implementations, the image signal processor may determine one or more image indications at 1240. For example, the image signal processor may determine one or more scene complexity metrics, such as one or more activity variance metrics as the image indications at 1240. For example, determining the image indications at 1240 may be similar to determining image indications described in relation to FIG. 11.

In some implementations, determining the image indications (at 1240) may include intermediate processing (e.g., as described in relation to the indication analysis module 1090) to compare image indications across a frame or GOP, to determine other encoding hints based on image indications, and/or to format image indications in a format accepted by and encoder. For example, an average value of image indications (e.g., scene complexity metrics) for blocks across a complete frame or GOP may be determined (at 1240). For example, relative complexity indications (e.g., a ratio of individual scene complexity metric values for blocks to the average value for the frame) may be determined (at 1240) based on the average value and the individual image indications for blocks.

For example, encoding hints may be determined (at 1240) based on the image indications. For example, a quantization parameter for a whole image or frame as an encoding hint may be determined (at 1240) based on image indications for blocks in the image or frame. For example, a quantization parameter for a block of pixels (e.g., a macro-block) as an encoding hint may be determined (at 1240) based on image indication(s) for the block as compared to other blocks within a frame or GOP. For example, a quantization parameter per frame or averaged (e.g., using a running mean) over several frames (e.g., 2 to 100 frames) may be determined (at 1240) as an encoding hint to reduce sudden quality changes.

Although not shown separately in FIG. 12A, in some implementations, the image signal processor may generate processed image data based on the input image data. For example, the image signal processor may process the image data as shown in FIG. 5 to generate the processed image data.

In some implementations, the image signal processor may output the processed image data, the image indications, or both at 1250. For example, the image signal processor may store the processed image data in a shared memory, such as the memory 1030 shown in FIG. 10A, accessible by the encoder. In an example, the image signal processor may store the image indications (processed image indications) in the shared memory as encoding hints. In some implementations, the image signal processor may store the processed image indications in the shared memory independently of storing the processed image data in the shared memory. In some implementations, storing the processed image indications may include storing information indicating an association between the encoding hint determined at 1240 and the block identified at 1230.

In some implementations, the encoder may receive source image data, such as source image data for a frame of a video sequence, source image indications corresponding to the source image data, or both at 1260. For example, the encoder may read, from the shared memory, the source image data, which may include the processed image data stored in the shared memory by the image signal processor at 1250. In an example, the encoder may read, from the shared memory, the source image indications, which may include the encoding hint stored in the shared memory by the image signal processor at 1250.

In some implementations, the encoder may determine one or more encoding parameters at 1270. For example, the encoder may determine a bit allocation, a quantization level, or both for encoding a block corresponding to the block identified at 1230 based on the encoding hint.

In some implementations, the encoder may generate an encoded frame at 1280. For example, the encoder may generate an encoded frame by encoding the frame received (as source image data) at 1260 based on the encoding parameter determined at 1270.

In some implementations, the encoder may output the encoded frame at 1290. For example, the encoder may store the encoded frame in the shared memory. In an example, the encoder may transmit (e.g., via wireless communications and/or a network such as the internet) the encoded frame to another device, such as a decoder, for subsequent decoding and presentation to a user of the other device.

Figure 12B:
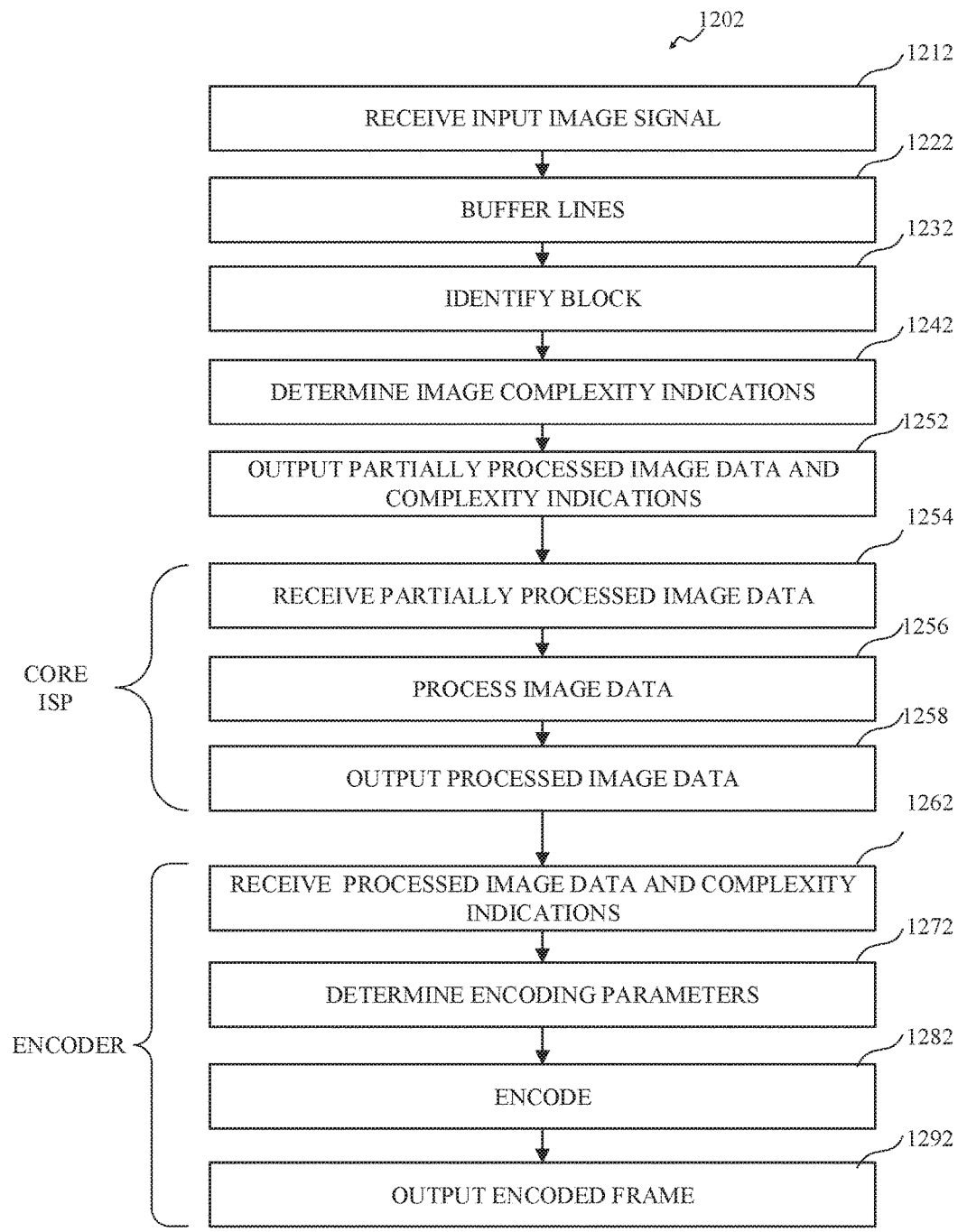
FIG. 12B shows an example of image signal processing and encoding with image signal processing based encoding hints for bitrate control in accordance with this disclosure.

FIG. 12B shows an example technique 1202 for image signal processing and encoding with image signal processing-based encoding hints for bitrate control in accordance with this disclosure. In this example, an image signal processor implements a multi-pass processing in two stages, a front ISP (e.g., the front ISP 1024) and a core ISP (e.g., the core ISP 1026). The front ISP performs first pass processing, including determining image indications over a complete frame of image data. The front ISP writes the resulting frame of partially processed image data to a memory (e.g., the memory 1030). Once a complete frame of partially processed image data is available in the memory, the core ISP performs second pass processing of the image data, which may be based in part on results (e.g., image indications) for a complete frame of image data from the first pass processing in the front ISP. Processed image data is passed directly from the core ISP to an encoder (e.g., the encoder 1042) in small increments (e.g., pixels, lines, or blocks of pixels) as it is generated (e.g., in raster order), avoiding an intermediate write to and read from the memory.

In effect, the core ISP functions and the encode functions may be combined in a single pass. This example technique 1202 may conserve processing resources, including memory bandwidth and processor time, and/or reduce latency. In some implementations, the technique 1202 may be implemented in an image capture apparatus, such as the image capture apparatus 110 shown in FIG. 1 or the dual lens image capture apparatus 300 shown in FIG. 3, or an image capture device, such as one of the image capture devices 130, 132, 134 shown in FIG. 1 or the image capture device 200 shown in FIG. 2. For example, an image capture device may include an image signal processor, such as the image signal processor 410 shown in FIG. 4, the image signal processor 500 shown in FIG. 5, or the front ISP 1024 and the core ISP 1026 shown in FIG. 10B. For example, an image capture device may include an encoder, such as the encoder 420 shown in FIG. 4 or the encoder 1042 shown in FIG. 10B, and the image capture device may implement the technique 1202.

In some implementations, the technique 1202 may include receiving an input image signal at 1212, buffering one or more lines of the input image signal at 1222, identifying a block at 1232, determining an image indication at 1242, outputting partially processed image data and image indications at 1252, receiving partially processed image data at 1254, processing the image data at 1256, outputting the processed image data at 1258, receiving the processed image data and image indications at 1262, determining encoding parameters at 1272, generating an encoded frame at 1282, outputting the encoded frame at 1292, and/or a combination thereof.

The front ISP may receive an input image signal at 1212. For example, the front ISP may receive the input image signal as shown at 1050 in FIG. 10B from an image sensor, such as the image sensor 1010 shown in FIG. 10B. For example, the image sensor may generate an image signal as an ordered, such as raster order, sequence of pixel, or sub-pixel, values, and may send the image signal to the image signal processor as the input image signal. In some implementations, the input image signal may represent each pixel value in a defined format, such as in a RAW image signal format. In some implementations, the input image signal may include an image, or frame, or a portion thereof, which may be one of a sequence of images of a video. For example, the image sensor may send the input image signal to the front ISP on a pixel-by-pixel or line-by-line basis.

In some implementations, the front ISP may buffer one or more lines of the input image signal at 1222. For example, the front ISP may include an internal storage unit, such as the internal storage unit 1022 shown in FIG. 10B, and the front ISP may buffer the one or more lines of the input image signal in the internal storage unit. In some implementations, lines of the input image signal may be buffered in the internal storage unit on a rolling basis.

In some implementations, the front ISP may identify a block at 1232. For example, the internal storage unit may include N, or more, line buffers, such as 4 or more line buffers, the front ISP may buffer N lines of the input image signal in the N line buffers at 1222, and the front ISP may identify an N×N, such as a 4×4, block from the N line buffers at 1232. Block sizes may vary with implementation and may be symmetric such as 4×4, 8×8, 16×16 or asymmetric such as 4×8, 8×4, etc.

In some implementations, the front ISP may determine one or more image indications at 1242. For example, the front ISP may determine one or more scene complexity metrics, such as one or more activity variance metrics as the image indications at 1242. For example, determining the image indications at 1242 may be similar to determining image indications described in relation to FIG. 11.

In some implementations, determining the image indications (at 1242) may include intermediate processing (e.g., as described in relation to the indication analysis module 1090) to compare image indications across a frame or GOP, to determine other encoding hints based on image indications, and/or to format image indications in a format accepted by and encoder. For example, an average value of image indications (e.g., scene complexity metrics) for blocks across a complete frame or GOP may be determined (at 1242). For example, relative complexity indications (e.g., a ratio of individual scene complexity metric values for blocks to the average value for the frame) may be determined (at 1242) based on the average value and the individual image indications for blocks.

For example, encoding hints may be determined (at 1242) based on the image indications. For example, a quantization parameter for a whole image or frame as an encoding hint may be determined (at 1242) based on image indications for blocks in the image or frame. For example, a quantization parameter for a block of pixels (e.g., a macro-block) as an encoding hint may be determined (at 1242) based on image indication(s) for the block as compared to other blocks within a frame or GOP. For example, a quantization parameter per frame or averaged (e.g., using a running mean) over several frames (e.g., 2 to 100 frames) may be determined (at 1242) as an encoding hint to reduce sudden quality changes.

For example, scene complexity metrics may be determined (at 1242) as a fixed point integer (e.g., 8 bits with 256 levels of complexity) for each block of pixels (e.g., a 4×4 block of pixels). Since data is collected on per block basis, this data can be used on per block basis or can be reduced to lessen the total amount of data to be transferred/handled during encoding.

The scene complexity metrics may be more coarsely quantized using a bucket approach at 1242. In some implementations, blocks with scene complexity metrics of certain subranges of the range of possible values for the metrics are placed in a bucket. For example, each bucket may correspond to specific number bits that will be allocated during encoding. For example, 8-bit activity data (256 levels) may be placed in 16 buckets, one bucket is for metric values lower than 16, a second bucket is for metric values in the range 16 to 31, and so on up to the sixteenth bucket for metric values in the range 240 to 255. Bits per block may be allocated based on which bucket the block activity falls. In some implementations, the thresholds between the buckets used to quantize the scene complexity metrics may be determined based in part on a set of scene complexity metrics for blocks within the frame. For example, one or more of the thresholds may be determined based on an average value of scene complexity metrics for blocks within the frame. For example, a four bucket quantization approach could be implemented using half the average, the average, and three-halves of the average as the three thresholds demarking the four buckets. For example, a distribution of scene complexity metrics within a frame may be taken into account by setting the thresholds based on other statistics of that distribution, such as a median or percentiles. In some implementations, one or more thresholds for quantization are determined based on a histogram of scene complexity metrics for blocks within the frame.

In some implementations, the amount of data needed to store the image indications may be reduced using a histogram approach. For example, a histogram may be generated of scene complexity metrics for blocks within a frame. This histogram may be used to determine differences in activity or complexity levels between blocks. Since there are many blocks in a frame (e.g. a 1920×1080 frame has 129600 blocks of 4×4), a band pass filter may be applied to histogram data to reduce the number of blocks. A band pass filter will eliminate blocks with very low activity and blocks with very high activity. A default (e.g., an average) bit distribution method is applied to eliminated blocks while and activity-based bit distribution method is applied to blocks which resulted as output of the band pass filter.

Although not shown separately in FIG. 12B, in some implementations, the front ISP may generate partially processed image data based on the input image data. For example, the image signal processor may process the image data as described in relation to the front ISP 510 of FIG. 5 to generate the partially processed image data.

The front ISP may output the partially processed image data, the image indications, or both at 1252. For example, the front ISP may store the processed image data in a shared memory, such as the memory 1030 shown in FIG. 10B, accessible by the encoder. In an example, the front ISP may store the image indications (e.g., scene complexity metrics) in the shared memory as encoding hints. In some implementations, the front ISP may store the processed image indications in the shared memory independently of storing the partially processed image data in the shared memory. In some implementations, storing the processed image indications may include storing information indicating an association between the encoding hint determined at 1242 and the block identified at 1232.

The core ISP may receive the partially processed image data at 1254. For example, the core ISP may read a frame of partially processed image data from the memory after the front ISP completes processing of that frame. The core ISP may process this partially processed image data at 1256 to implement second pass processing, which may utilize data (e.g., image metrics) for a complete frame. For example, the core ISP may perform temporal noise reduction as discussed in relation to FIG. 5. The processing 1256 may be completed in increments (e.g., by pixel, line, or block of pixels), producing small quantities of processed image data that are ready for forwarding. For example, these incremental portions of the processed image data for a frame may be stored in a buffer (e.g., the internal buffer 1028), which may be too small to store a complete frame of image data.

The core ISP may output the processed image data at 1258. For example, the data may be output directly to the encoder in small increments (e.g., by pixel, line, or block of pixels) as the processed image data becomes available. For example, the processed image data may be output at 1258 by copying one or more increments of processed image data from an internal buffer of the core ISP to internal storage of the encoder.

The encoder may receive image indications for a frame of video image data at 1262. For example, the encoder may receive the image indications by reading the image indications from the memory where they were stored by the front ISP. For example, the image indications may include scene complexity metrics for the blocks pixels within the frame. In an example, the encoder may read, from the memory, the image indications, which may include the encoding hints stored in the shared memory by the front ISP at 1252. The encoder may also receive (at 1262) processed image data from the core ISP. For example, the processed image data may be received (at 1262) directly from a buffer of memory within the core ISP, where the buffer of memory stores less than a complete frame of the processed image data. For example, the processed image data may be received (at 1262) in small increments (e.g., by pixel, line, or block of pixels) as the processed image data becomes available and before it is overwritten in an internal buffer of the core ISP. For example, the processed image data may be received (at 1262) in a raster order after the corresponding image indications (e.g., scene complexity metrics) for a frame are received (at 1262) or available to read from the memory.

In some implementations, the encoder may determine one or more encoding parameters at 1272. For example, the encoder may determine a bit allocation, a quantization level, or both for encoding a block corresponding to the block identified at 1232 based on scene complexity metrics included in the image indications as encoding hints. In some implementations, the encoding parameters depend on scene complexity metrics for many blocks across a frame of the image data. For example, the coding parameters for individual blocks within a frame may depend on the scene complexity metric for that block relative to the scene complexity metrics for other blocks in the frame. In some implementations, the encoding parameters depend on scene complexity metrics for many blocks across a GOP of the image data as it will be encoded. For example, the encoder may buffer multiple frames of video from the processed image data and examine corresponding image indications from across the GOP to determine bit allocations among the various frames and/or blocks of pixels within the GOP.

In some implementations, the encoding parameters may specify a number of bits to be used to encode a block within a frame of the encoded video. For example, a limited budget of bits for encoding a frame may be allocated among blocks within the frame based on the relative values of the image indications (e.g., scene complexity metrics) corresponding to those blocks. In some implementations, the encoding parameters may specify a number of bits to be used to encode a frame of the encoded video. For example, a limited budget of bits for encoding a GOP may be allocated among frames within the frame based on the values of the image indications (e.g., scene complexity metrics) corresponding to blocks within the frame relative to the values for blocks in other frames of the GOP. In some implementations, the encoding parameter may specify a number of bits to be used to encode a group of pictures of the encoded video. For example, the bit allocation for a GOP may depend on the image indications (e.g., scene complexity metrics) for blocks across the GOP.

In some implementations, the encoder may quantize image indications (e.g., scene complexity metrics) before using them to encode a large segment of a video signal (e.g., a GOP). This may facilitate storage of the image indications in a more useful format and/or using less internal memory of the encoder. For example, the encoder may implement one or more of the quantization approaches described in relation to operation 1242. In some implementations, image indications for blocks within multiple frames corresponding to a GOP of encoded video may be quantized using one or more thresholds that are determined based in part on a set of image indications for blocks within the frames corresponding to the GOP. For example, one or more quantization thresholds may be determined based on a histogram of image indications for blocks within the frames corresponding to the GOP. For example, one or more quantization thresholds may be determined based on an average value of scene complexity metrics for blocks within the frames corresponding to the GOP. For example, a distribution of scene complexity metrics within the frames corresponding to the GOP may be taken into account by setting the quantization thresholds based on other statistics of that distribution, such as a median or percentiles.

In some implementations, the encoder may generate an encoded frame at 1282. For example, the encoder may generate an encoded frame by encoding processed image data received at 1262 based on the encoding parameter(s) determined at 1272.

In some implementations, the encoder may output the encoded frame at 1292. For example, the encoder may store the encoded frame in the shared memory. In an example, the encoder may transmit (e.g., via wireless communications and/or a network such as the internet) the encoded frame to another device, such as a decoder, for subsequent decoding and presentation to a user of the other device.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A method comprising:
   receiving, by an image signal processor, an input video including a sequence of input frames;
   determining, by the image signal processor, image indications based on the input video;
   storing the image indications in a shared memory, wherein storing the image indications in the shared memory comprises storing the image indications as encoding hints in the shared memory such that the encoding hints are respectively associated with blocks within a frame of the input video;
   reading, by an encoder, the image indications from the shared memory;
   determining, by the encoder, an encoding parameter based on the image indications;
   generating, by the encoder, an encoded video using the encoding parameter; and
   outputting or storing, by the encoder, the encoded video.

2. The method of claim 1, wherein the image indications for a plurality of frames are stored in the shared memory concurrently.

3. The method of claim 1, wherein the encoding parameter specifies a number of bits to be used to encode a block within a frame of the encoded video.

4. The method of claim 1, wherein the encoding parameter specifies a number of bits to be used to encode a frame of the encoded video.

5. The method of claim 1, wherein the encoding parameter specifies a number of bits to be used to encode a group of pictures of the encoded video.

6. The method of claim 1, comprising:
quantizing the image indications for blocks within a frame of the input video using one or more thresholds that are determined based in part on a set of image indications for blocks within the frame.

7. The method of claim 6, wherein the one or more thresholds are determined based on a histogram of image indications for blocks within the frame.

8. The method of claim 6, wherein the one or more thresholds are determined based on an average value of image indications for blocks within the frame.

9. The method of claim 1, comprising:
quantizing the image indications for blocks within a plurality of frames in a group of pictures of the encoded video using one or more thresholds that are determined based in part on a set of image indications for blocks within the plurality of frames.

10. The method of claim 9, wherein the one or more thresholds are determined based on a histogram of image indications for blocks within the plurality of frames.

11. The method of claim 9, wherein the one or more thresholds are determined based on an average value of image indications for blocks within the plurality of frames.

12. The method of claim 1, wherein generating, by the encoder, the encoded video using the encoding parameter comprises:
reading frames of video data that have been processed by the image signal processor from the shared memory for encoding using the encoding parameters.

13. The method of claim 1, wherein generating, by the encoder, the encoded video using the encoding parameter comprises:
receiving video data that has been processed by the image signal processor directly from a buffer of memory within a second stage of the image signal processor, where the buffer of memory stores less than a complete frame of the video data, for encoding using the encoding parameters.

14. The method of claim 1, wherein determining the image indications comprises determining an activity variance metric for a block within a frame of the input video.

15. The method of claim 14, wherein a determining the activity variance metric includes determining a sum of absolute differences for the block.

16. The method of claim 1, wherein determining, by the image signal processor, image indications based on the input video comprises:

determining a difference block between corresponding blocks in successive frames of the input video; and
determining one or more activity variance metrics for the difference block.

17. The method of claim 16, wherein determining a difference block between corresponding blocks in successive frames of the input video comprises:
applying local motion compensation to the corresponding blocks in successive frames of the input video; and
determining the difference block based on the local motion compensated blocks.

18. The method of claim 16, wherein the one or more activity variance metrics include a sum of absolute differences between pixels in the difference block.

19. A method comprising:
accessing, by an image signal processor, an input video including a sequence of input frames;
determining, by the image signal processor, image indications based on the input video;
storing the image indications in a shared memory;
reading, by an encoder, the image indications from the shared memory;
determining, by the encoder, an encoding parameter based on the image indications;
generating, by the encoder, an encoded video using the encoding parameter, wherein generating the encoded video using the encoding parameter includes:
accessing video data that has been processed by the image signal processor directly from a buffer of memory within a second stage of the image signal processor, where the buffer of memory stores less than a complete frame of the video data, for encoding using the encoding parameters; and
outputting or storing, by the encoder, the encoded video.

20. A method comprising:
accessing, by an image signal processor, an input video including a sequence of input frames;
determining, by the image signal processor, image indications based on the input video;
storing the image indications in a shared memory;
reading, by an encoder, the image indications from the shared memory;
determining, by the encoder, an encoding parameter based on the image indications, wherein determining, the image indications based on the input video includes:
determining a difference block between corresponding blocks in successive frames of the input video; and
determining one or more activity variance metrics for the difference block;
generating, by the encoder, an encoded video using the encoding parameter; and
outputting or storing, by the encoder, the encoded video.

* * * * *